United States Patent
Miyashita et al.

(10) Patent No.: US 9,524,823 B2
(45) Date of Patent: Dec. 20, 2016

(54) COIL UNIT AND NONCONTACT POWER TRANSMISSION APPARATUS

(71) Applicant: PANASONIC CORPORATION, Osaka (JP)

(72) Inventors: Norihiro Miyashita, Shiga (JP); Atsushi Fujita, Shiga (JP); Hideki Sadakata, Shiga (JP); Yoshiharu Omori, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 384 days.

(21) Appl. No.: 14/193,965

(22) Filed: Feb. 28, 2014

(65) Prior Publication Data
US 2014/0175899 A1  Jun. 26, 2014

Related U.S. Application Data

(63) Continuation of application No. PCT/JP2012/007083, filed on Nov. 5, 2012.

(30) Foreign Application Priority Data

Nov. 4, 2011  (JP) .................................. 2011-241893

(51) Int. Cl.
*H02J 5/00* (2016.01)
*H01F 38/14* (2006.01)
*B60L 11/18* (2006.01)

(52) U.S. Cl.
CPC .............. *H01F 38/14* (2013.01); *H02J 5/005* (2013.01); *H02J 50/10* (2016.02); *H02J 50/70* (2016.02); *B60L 11/182* (2013.01)

(58) Field of Classification Search
CPC .......... B60L 11/182; H02J 5/005; H02J 7/025; H02J 17/00; H02J 50/10; H02J 50/12; H02J 50/70; H01F 38/14; H04B 5/0037
See application file for complete search history.

(56) References Cited

U.S. PATENT DOCUMENTS 5,615,091 A  3/1997  Palatnik
6,252,386 B1  6/2001  Minami et al.
(Continued)

FOREIGN PATENT DOCUMENTS

EP  2 475 062     7/2012
JP  2001-148606 A  5/2001
(Continued)

OTHER PUBLICATIONS

Supplementary European Search Report issued in corresponding European Patent Application No. 12846021.9, mailed on Sep. 29, 2015.

(Continued)

*Primary Examiner* — Ryan Johnson
(74) *Attorney, Agent, or Firm* — McDermott Will & Emery LLP

(57) ABSTRACT

A coil unit configured to transmit or receive electric power by electromagnetic induction in a noncontact manner, including: a coil into or from both terminals of which a high-frequency voltage is input or output; a metal conductor placed near the coil; and a first capacitor and a second capacitor connected to the terminals of the coil, wherein the ratio of the capacitance between the first capacitor and the second capacitor is set to a value at which a current induced into the metal conductor due to capacitance coupling when a high-frequency voltage is input into or output from the coil is reduced.

11 Claims, 17 Drawing Sheets

(56) References Cited

U.S. PATENT DOCUMENTS

| | | | |
|---|---|---|---|
| 8,508,184 B2* | 8/2013 | Sakakibara | B60L 5/005 180/65.1 |
| 9,281,719 B2* | 3/2016 | Ichikawa | H02M 5/10 |
| 2004/0263282 A1 | 12/2004 | Kaku et al. | |
| 2008/0231120 A1* | 9/2008 | Jin | H02J 5/005 307/104 |
| 2008/0297107 A1 | 12/2008 | Kato et al. | |
| 2013/0009650 A1 | 1/2013 | Sakakibara et al. | |
| 2013/0038281 A1 | 2/2013 | Sakakibara et al. | |

FOREIGN PATENT DOCUMENTS

| | | |
|---|---|---|
| JP | 2001-268823 A | 9/2001 |
| JP | 2007-252027 A | 9/2007 |
| WO | 2007/076043 A2 | 7/2007 |

OTHER PUBLICATIONS

Supplementary European Search Report dated Jan. 16, 2016 in Application No. EP 12846021.9.
International Search Report issued in PCT/JP2012/007083, dated Jan. 29, 2013, with English translation, 4 pages.

* cited by examiner

COIL UNIT AND NONCONTACT POWER TRANSMISSION APPARATUS

CROSS-REFERENCE TO RELATED APPLICATIONS

This is a continuation of International Application No. PCT/JP2012/007083 filed on Nov. 5, 2012, which claims priority to Japanese Patent Application No. 2011-241893 filed on Nov. 4, 2011. The entire disclosures of these applications are incorporated by reference herein.

BACKGROUND

The present disclosure relates to a coil unit that transmits or receives electric power by electromagnetic induction in a noncontact manner and a noncontact power transmission apparatus having such a coil unit.

In recent years, a noncontact power transmission apparatus is being developed for noncontact charging of electric power into a vehicle such as an electric car, for example. In this noncontact power transmission apparatus, where a power-transmitting coil is provided on the power feed device side and a power-receiving coil on the vehicle side, high transmission efficiency has been achieved by electromagnetic induction in a noncontact manner. Such a noncontact power transmission apparatus using electromagnetic induction has a problem that a leakage electromagnetic field is large because it transmits large electric power, and thus reducing the leakage electromagnetic field is an essential challenge to be addressed. The leakage electromagnetic field includes a leakage magnetic field from a coil and a leakage electromagnetic field caused by a current induced into a conductor such as a metal wound around the coil. Reducing the current induced into the conductor wound around the coil itself is also an essential challenge from a safety standpoint.

Japanese Unexamined Patent Publication No. 2001-148606 describes a technique of reducing disturbance of radio waves by performing balanced driving at both ends of a loop antenna in a wireless communication system.

SUMMARY

At the time of noncontact charging of electric power into a vehicle such as an electric car, a power feed device provided with a power-transmitting coil is placed under the vehicle provided with a power-receiving coil. There is therefore the possibility that the vehicle may override the power feed device. For this reason, the power-transmitting coil is required to have a strength high enough to stand such a load. There is also the possibility that a shock may be exerted on the power-receiving coil mounted on the vehicle due to collision of the vehicle, etc. Therefore, the power-receiving coil is also required to have a strength high enough to stand such a shock.

In view of the above, to protect the power-transmitting coil and the power-receiving coil against a load and a shock from outside, housing such coils in cases made of metal is considered.

However, when the power-transmitting coil or the power-receiving coil is housed in a metal case, this naturally means that a conductor, i.e., the metal, is to be placed near the coil. As a result, with application of a high-frequency voltage to the coil, an induced current will flow to the metal conductor due to capacitance coupling between the coil and the metal conductor. Since the coil and the metal conductor are very close to each other, the capacitance coupling will be large. This will increase the current induced into the metal conductor, and thus the influence of a leakage electromagnetic field caused by the induced current will raise a problem. In particular, since large electric power must be transmitted in noncontact charging of power into a vehicle, such influence of the leakage electromagnetic field caused by capacitance coupling will become evident.

It is a major objective of the present disclosure to provide a coil unit and a noncontact power transmission apparatus in which, even when a metal conductor is placed near a power-transmitting coil or a power-receiving coil, the current induced into the metal conductor due to capacitance coupling and the influence of a leakage electromagnetic field caused by the induced current, are reduced.

The coil unit according to one aspect of the present disclosure is a coil unit configured to transmit or receive electric power by electromagnetic induction in a noncontact manner, including: a coil into or from both terminals of which a high-frequency voltage is input or output; a metal conductor placed near the coil; and a first capacitor and a second capacitor connected to the terminals of the coil. The ratio of the capacitance between the first capacitor and the second capacitor is set to a value at which a current induced into the metal conductor due to capacitance coupling when a high-frequency voltage is input into or output from the coil is reduced.

According to the present disclosure, in a coil unit that transmits or receives electric power by electromagnetic induction in a noncontact manner, the current induced into a metal conductor placed near the coil due to capacitance coupling, and the influence of a leakage electromagnetic field caused by the induced current, can be reduced.

DETAILED DESCRIPTION

Embodiments of the present disclosure will be described hereinafter with reference to the accompanying drawings. Note that the present disclosure is not limited to the embodiments to follow. Note also that modifications to the embodiments can be made appropriately as far as the advantage of the disclosure can be obtained, and that each of the embodiments can be combined with another embodiment.

(First Embodiment)

Figure 1:
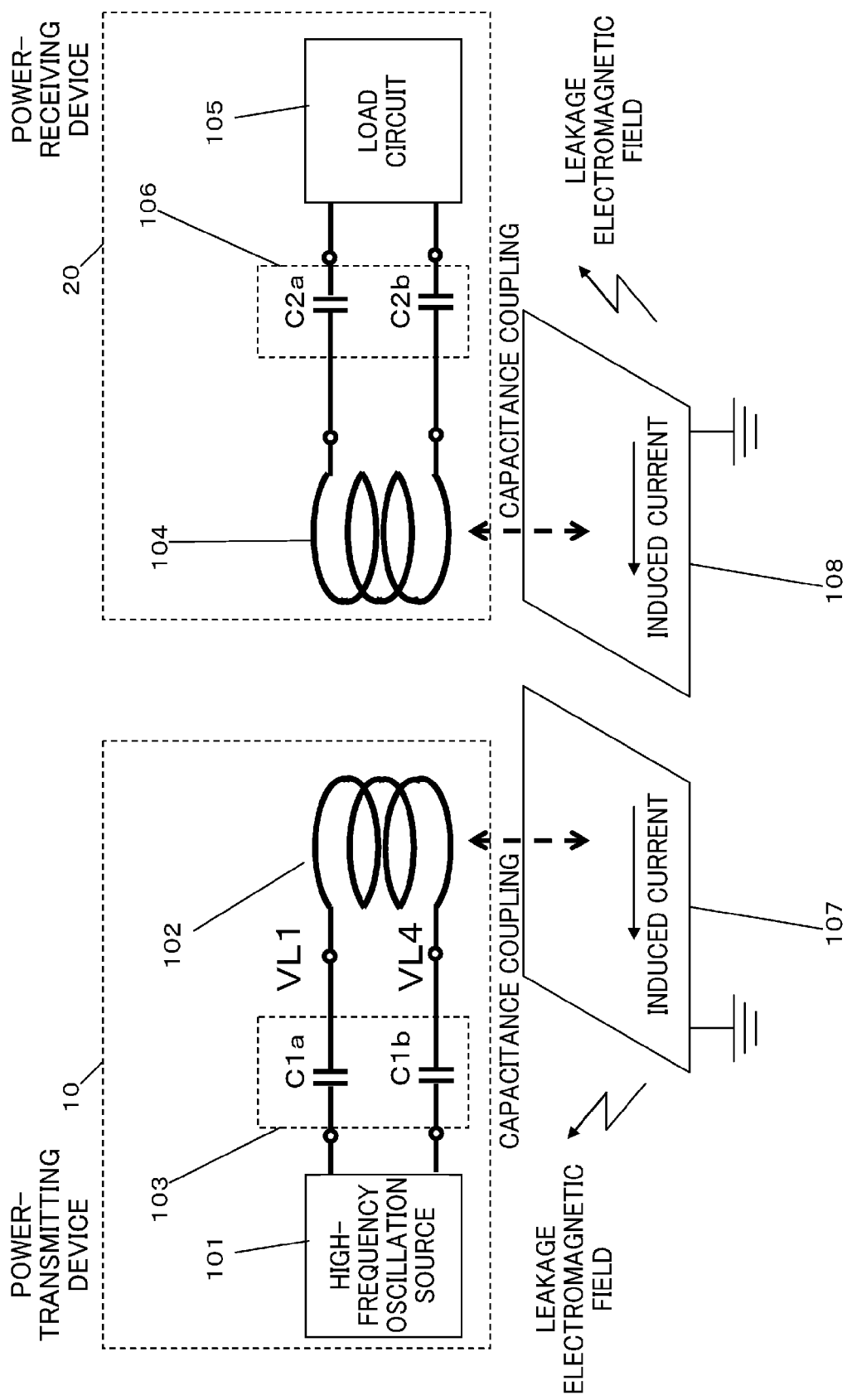
FIG. 1 is a view showing a configuration of a noncontact power transmission apparatus in the first embodiment of the present disclosure.

FIG. 1 is a view schematically showing a configuration of a noncontact power transmission apparatus in the first embodiment of the disclosure.

In FIG. 1, the noncontact power transmission apparatus includes a power-transmitting device 10 placed at a predetermined site and a power-receiving device 20 placed on a mobile unit. The noncontact power transmission apparatus according to the present disclosure is typically applied to a noncontact power feed system for an electric propulsion vehicle such as an electric car, for example. In this case, the power-receiving device 20 is placed on an electric propulsion vehicle as the mobile unit, and the power-transmitting device 10 is fixedly installed typically in a parking lot. The power-transmitting device 10 is not limited to a fixedly installed one, but may be movable.

The power-transmitting device 10 includes a high-frequency oscillation source 101, a power-transmitting coil 102, and a first capacitor C1a and a second capacitor C1b connected to both terminals of the power-transmitting coil 102. The power-receiving device 20 includes a power-receiving coil 104, a load circuit 105, and a first capacitor C2a and a second capacitor C2b connected to both terminals of the power-receiving coil 104.

The high-frequency oscillation source 101 generates and outputs high-frequency electric power. The power-transmitting coil 102, connected to the high-frequency oscillation source 101, generates a high-frequency magnetic field.

The power-receiving coil 104 receives the magnetic field generated by the power-transmitting coil 102 to obtain electric power. The load circuit 105 is connected to the power-receiving coil 104, and includes a rectifier circuit that feeds the power obtained from the power-receiving coil 104, a battery, etc.

Metal conductors 107 and 108 are placed near the power-transmitting coil 102 and the power-receiving coil 104, respectively, and are capacitively coupled to the coils. As the metal conductor placed near the coil 102 or 104, a situation that a case for housing the coil 102 or 104 is made of metal is considered, for example. In this situation, part of the case may be made of metal. As another example, when the power-receiving coil 104 is mounted on a vehicle, the metal conductor placed near the coil 104 can be a metal body (e.g., a metal chassis) constituting part of the vehicle.

The metal conductors 107 and 108 according to the disclosure are not limited to those described above, but may be any metal conductors that are placed near the coils 102 and 104 and capacitively coupled to the coils 102 and 104 causing generation of induced currents. The shape of the conductors is not limited to a plate shape as shown in FIG. 1, but may be any shape. Also, the distance from the coils 102 and 104 is not limited to being fixed, but may vary depending on the place.

According to the disclosure, the power-transmitting coil 102 into both terminals of which a high-frequency voltage is input, the metal conductor 107 placed near the power-transmitting coil 102, and the first and second capacitors C1a and C1b connected to the terminals of the power-transmitting coil 102 constitute a coil unit on the power-transmitting side. Likewise, the power-receiving coil 104 from both terminals of which a high-frequency voltage is output, the metal conductor 108 placed near the power-receiving coil 104, and the first and second capacitors C2a and C2b connected to the terminals of the power-receiving coil 104 constitute a coil unit on the power-receiving side.

The operation of the noncontact power transmission apparatus having the configuration as described above will be described.

Figure 2:
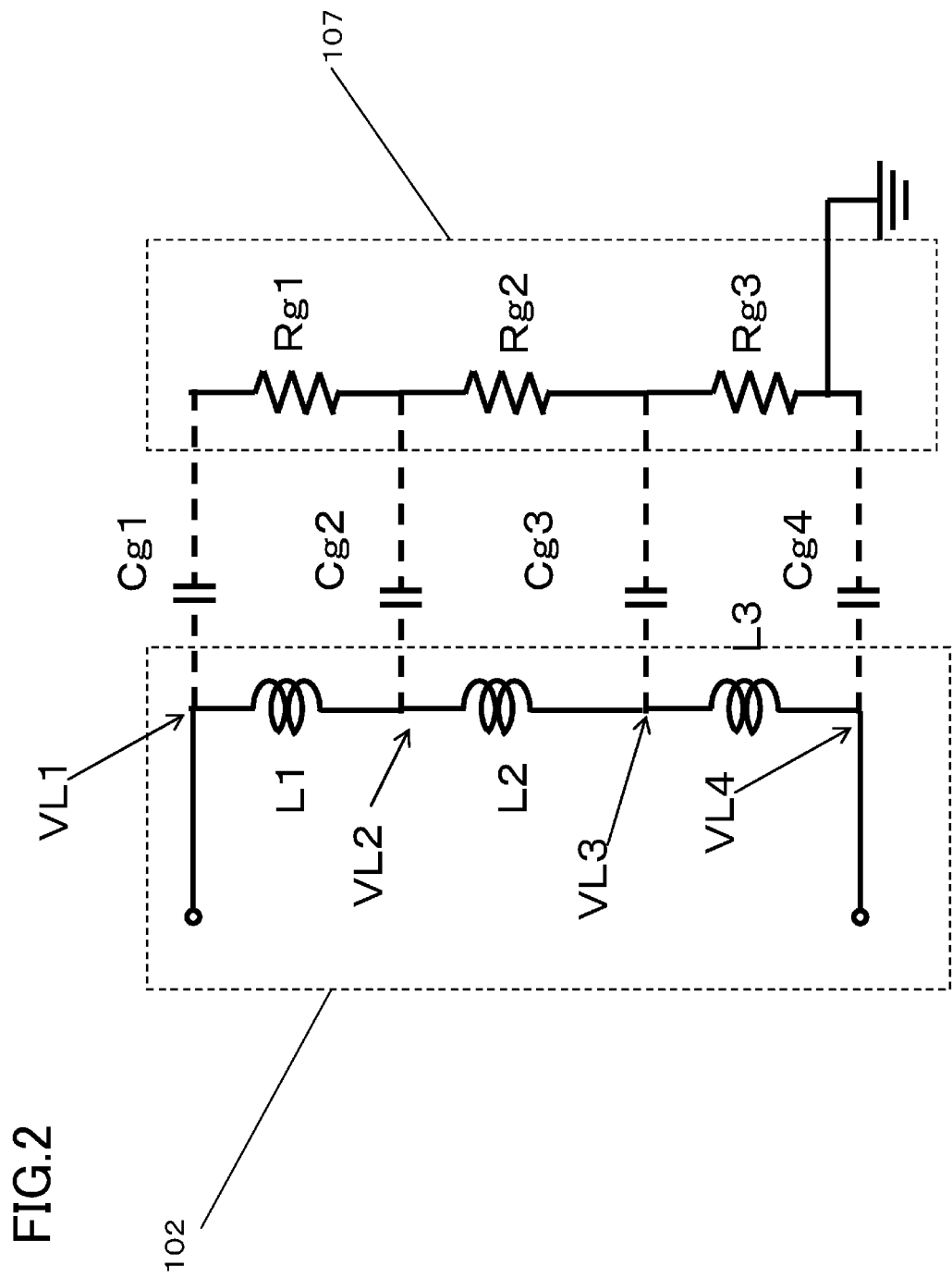
FIG. 2 is a view showing a simple equivalent circuit model of capacitance coupling between a power-transmitting coil and a metal conductor in the first embodiment.

FIG. 2 is a view showing a simple equivalent circuit model of capacitance coupling between the power-transmitting coil 102 and the metal conductor 107. It is assumed that the power-transmitting coil 102 and the metal conductor 107 are capacitively coupled to each other at positions of the power-transmitting coil 102 with capacitances Cg1 to Cg4. Also, regions of the metal conductor 107 are represented by resistances Rg1 to Rg4. As the coupling between the power-transmitting coil 102 and the metal conductor 107 becomes stronger, the capacitances Cg1 to Cg4 increase, increasing the induced current flowing to the metal conductor 107. Also, as the potentials at the positions VL1 to VL4 of the power-transmitting coil 102 are higher, the induced current flowing to the metal conductor 107 via the capacitances Cg1 to Cg4 increases.

The capacitances Cg1 to Cg4 vary with the structures of the power-transmitting coil 102 and the metal conductor 107 and the positional relationship therebetween. In the case that Cg1 and Cg2 are larger than Cg3 and Cg4, for example, the induced current flowing to the entire metal conductor 107 will be reduced if VL1 is set to be lower than VL4.

Also, in the case that the region of the resistance Rg1, out of the resistances Rg1 to Rg3, is in a loop shape, for example, similar to the shape of an antenna, the leakage electromagnetic field will be largest when the induced current flows to the region of the resistance Rg1. In this case, the leakage electromagnetic field caused by the metal conductor 107 will be reduced if VL1 is set to be lower than VL4.

The potentials VL2 and VL3 at the inner positions of the power-transmitting coil 102 vary with the coil structure o the power-transmitting coil 102 such as the way to wind the coil and the shape. This is because the inductances L1 to L3 of the regions of the power-transmitting coil 102 vary with the coil structure. In the case that Cg2 is larger than Cg3, for example, the current induced into the metal conductor 107 and the leakage electromagnetic field caused by this current will be reduced if VL2 is lower than VL3. In such a case, it is better to set VL2 to be lower than VL3 by adjusting the potential difference between VL1 and VL4.

As described above, the power-transmitting coil 192 is capacitively coupled to the metal conductor 107 at the positions of the power-transmitting coil 102. As the capacitance coupling between the power-transmitting coil 102 and the metal conductor 107 becomes stronger, the capacitances Cg1 to Cg4 at the regions increase, increasing the induced current flowing to the metal conductor 107. Also, as the potentials at the positions VL1 to VL4 of the power-transmitting coil 102 are higher, the induced current flowing to the metal conductor 107 via the capacitances Cg1 to Cg4 increases.

The capacitances Cg1 to Cg4 generated between the power-transmitting coil 102 and the metal conductor 107 vary with the structures of the power-transmitting coil 102 and the metal conductor 107 and the positional relationship therebetween. In order to reduce the induced current flowing to the entire metal conductor 107, it is necessary to have a configuration permitting adjustment of the potentials at the positions VL1 to VL4 of the power-transmitting coil 102.

The present disclosure has been made based on the findings described above, in which the potentials at the positions VL1 to VL4 of the power-transmitting coil 102 are adjusted by appropriately setting the potentials VL1 and VL4 at both terminals of the power-transmitting coil 102, to achieve reduction in the current induced into the metal conductor 107 and the leakage electromagnetic field caused by the induced current.

As a means for appropriately setting the potentials VL1 and VL4 at both terminals of the power-transmitting coil 102, there is a method where the first and second capacitors C1$a$ and C1$b$ are provided at both terminals of the power-transmitting coil 102, as shown in FIG. 1, and the capacitance values of C1$a$ and C1$b$ are set to values with which the current induced to the metal conductor 107 due to the capacitance coupling is reduced.

Note that, as described above, in the equivalent circuit shown in FIG. 2, the capacitances Cg1 to Cg4 at the positions of the power-transmitting coil 102 are not determined uniquely because they vary with the placement and shape of the metal conductor 107. In reality, therefore, the following method is used. A coil unit where the metal conductor 107 is placed near the power-transmitting coil 102 (e.g., a coil unit where the power-transmitting coil 102 is housed in a metal case) is prepared. With the magnitudes of the capacitors C1$a$ and C1$b$ connected to both terminals of the power-transmitting coil 102 being changed individually, the current induced into the metal conductor 107 when a high-frequency voltage is input into the power-transmitting coil 102 is measured, to determine the ratio between the capacitances (C1$a$/C1$b$) at which the induced current is reduced.

A procedure for determining the magnitudes of the capacitors C1$a$ and C1$b$ connected to both terminals of the power-transmitting coil 102 will be described hereinafter with reference to FIGS. 3A to 9. Note that, to make the phenomenon easy to understand, results of circuit simulations using equivalent circuits will be presented herein.

Figure 3B:
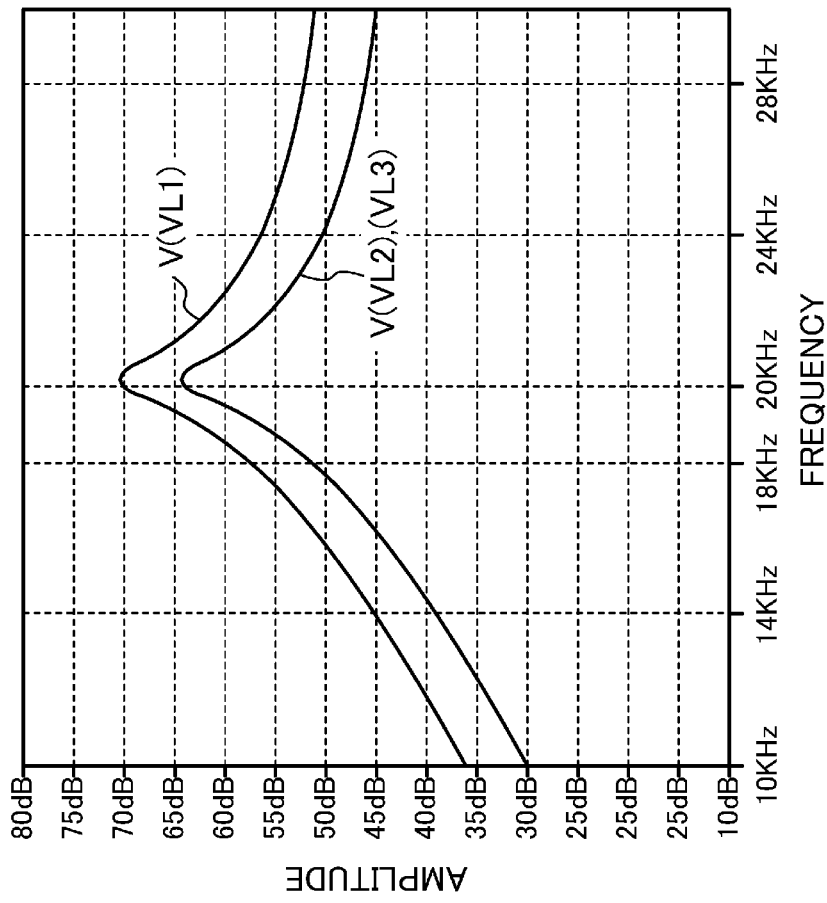
FIGS. 3A and 3B are views for explaining a procedure for determining the magnitudes of capacitors connected to both terminals of the power-transmitting coil.
Figure 3A:
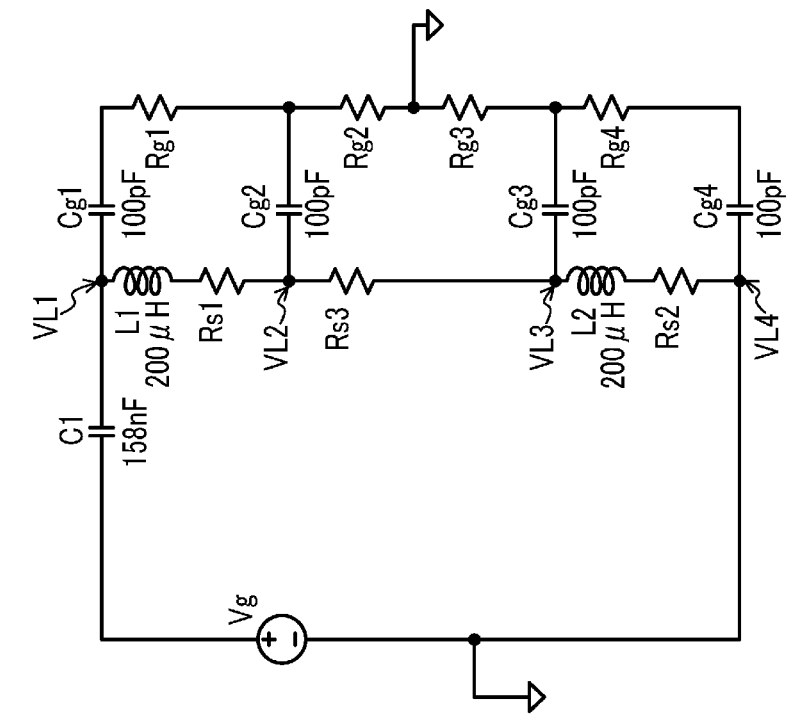

FIG. 3A is a view showing an equivalent circuit model of capacitance coupling between the power-transmitting coil 102 and the metal conductor 107. The power-transmitting coil 102 and the metal conductor 107 are capacitively coupled to each other at the positions VL1 to VL4 of the power-transmitting coil 102 with the capacitances Cg1 to Cg4. Also, the metal conductor 107 is represented by the resistances Rg1 to Rg4 in the regions thereof.

The inductance (L) of the power-transmitting coil 102 is 400 µH, and the power-transmitting coil 102 is represented by two coils L1 and L2 each having an inductance of 200 µH. The capacitances Cg1 to Cg4 are all 100 pF. A capacitor C1 is serially connected to one terminal of the power-transmitting coil 102 for improving the power transmission efficiency. The capacitor C1 constitutes an LC resonant circuit with the power-transmitting coil 102, and is set to 158 nF.

FIG. 3B shows frequency characteristics of the amplitudes of the voltages at the positions VL1 to VL3 of the power-transmitting coil 102 when the high-frequency voltage Vg shown in FIG. 3A is 200 V. Note that the voltages V(VL2) and V(VL3) at the positions VL2 and VL3 have the same amplitude, and the voltage at VL4 is zero.

Figure 4:
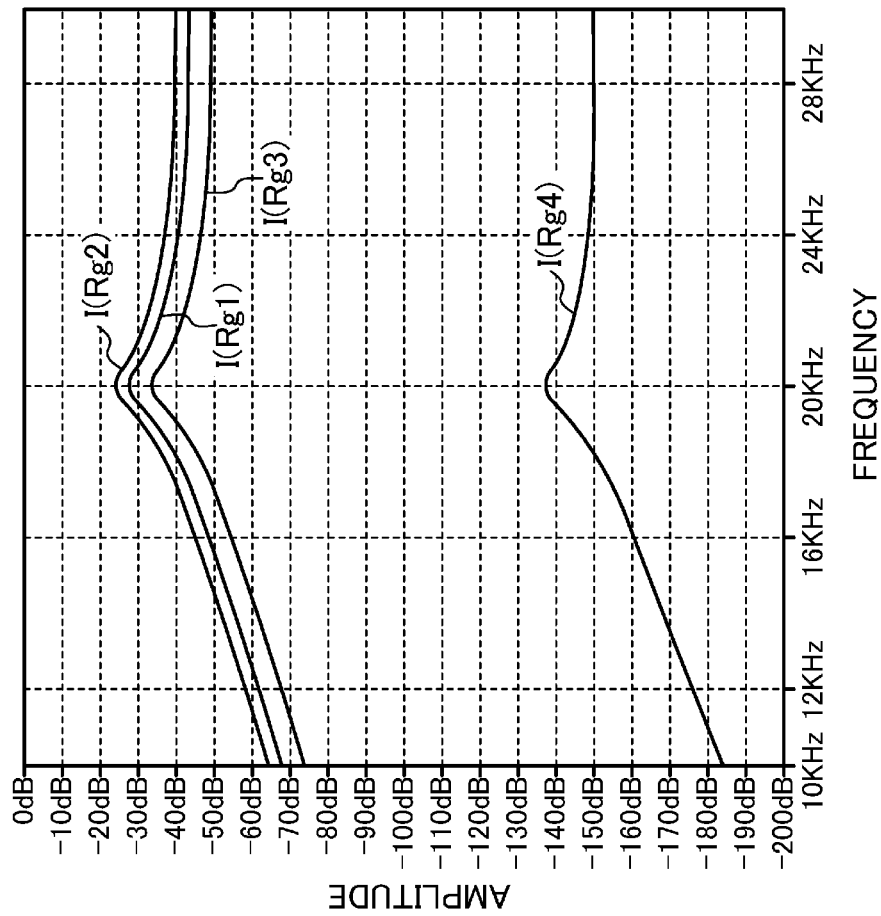
FIG. 4 is a view for explaining the procedure for determining the magnitudes of the capacitors connected to both terminals of the power-transmitting coil.

FIG. 4 shows frequency characteristics of the amplitudes I(Rg1) to I(Rg4) of the currents induced into the regions Rg1 to Rg4 of the metal conductor 107 when the high-frequency voltage Vg shown in FIG. 3A is 200 V.

Note that, in the following description, the frequency characteristics of the amplitudes of the voltages at the positions VL1 to VL4 and the currents in the resistances Rg1 to Rg4 are all those observed when the high-frequency voltage Vg is 200 V.

Figure 5B:
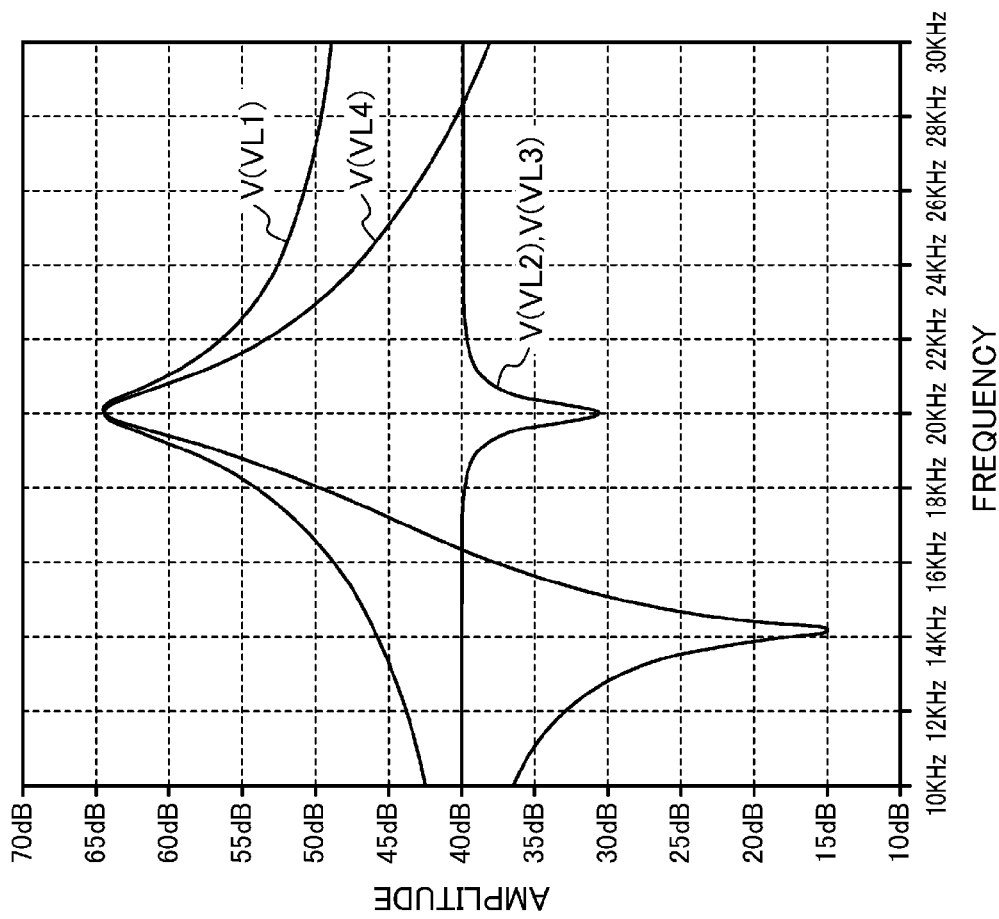
FIGS. 5A and 5B are views for explaining the procedure for determining the magnitudes of the capacitors connected to both terminals of the power-transmitting coil.
Figure 5A:
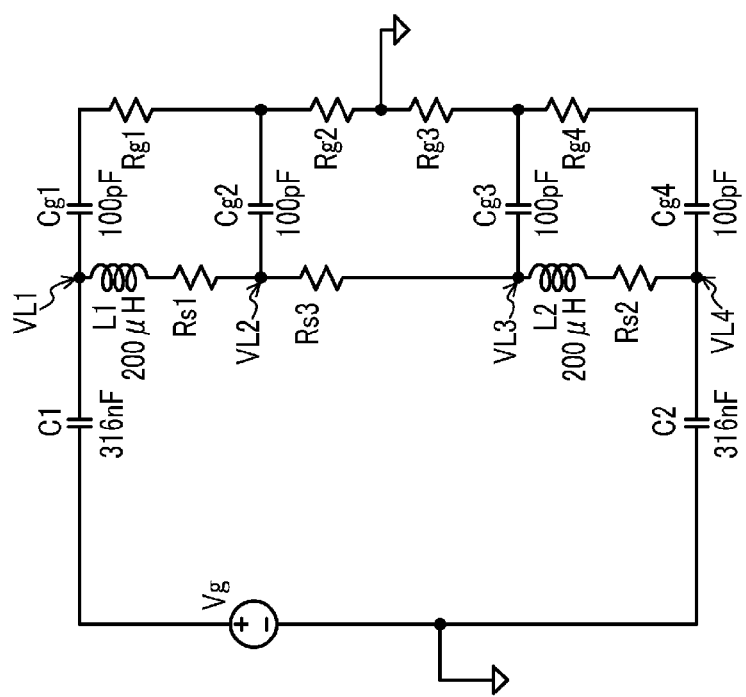

FIG. 5A shows an equivalent circuit model in which, in the equivalent circuit model shown in FIG. 3A, the capacitor C1 is divided into two capacitors C1 and C2, which are connected to both terminals of the power-transmitting coil 102, for reducing the voltages at both terminals VL1 and VL4 of the power-transmitting coil 102. In this relation, the capacitances of the capacitors C1 and C2 are set to 316 nF each so that the combined capacitance of the capacitors C1 and C2 constitutes an LC resonant circuit with the power-transmitting coil 102.

Figure 6:
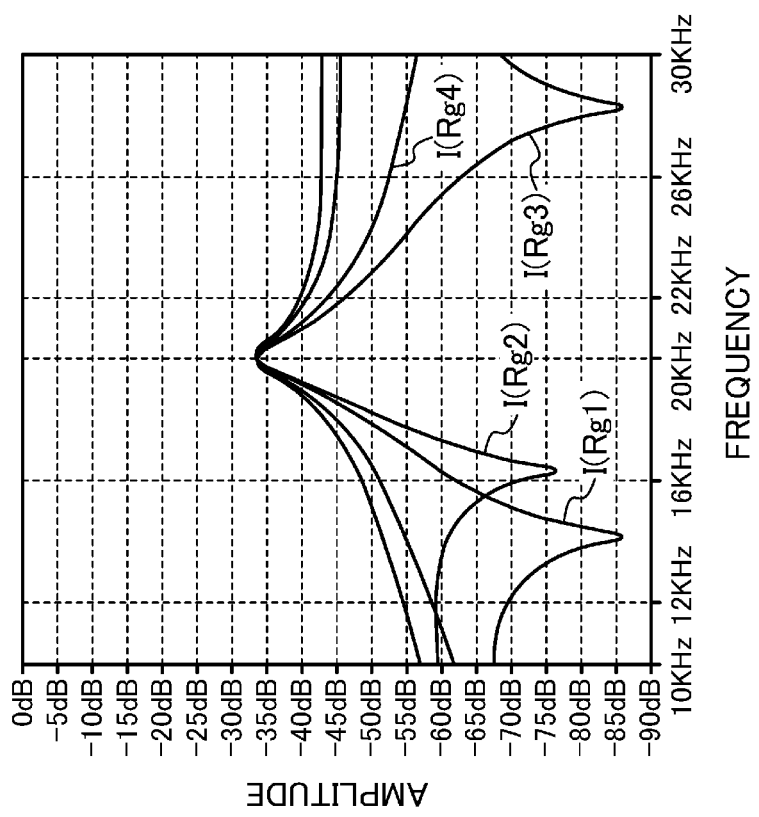
FIG. 6 is a view for explaining the procedure for determining the magnitudes of the capacitors connected to both terminals of the power-transmitting coil.

FIG. 5B shows frequency characteristics of the amplitudes of the voltages at the positions VL1 to VL4 of the power-transmitting coil 102 in the equivalent circuit model shown in FIG. 5A. FIG. 6 shows frequency characteristics of the amplitudes of the currents induced into the regions Rg1 to Rg4 of the metal conductor 107 in the equivalent circuit model shown in FIG. 5A.

As shown in FIG. 5B, by connecting the capacitors C1 and C2 to the terminals VL1 and VL4 of the power-transmitting coil 102, the voltages V(VL1) and V(VL4) at the terminals VL1 and VL4 at 20 kHz are 65 dB, which is reduced to a half from 70 dB of the voltage V(VL1) shown in FIG. 3B. As a result, the maximum value of the current at 20 kHz flowing into the regions of the metal conductor 107 is reduced from −25 dB (see I(Rg2) in FIG. 4) to −34 dB (see I(Rg1) to I(Rg4) in FIG. 6).

Note that, in the following description, all of the amplitudes of the voltages at positions VL1 to VL4 and the currents in the resistances Rg1 to Rg4 are those observed when the frequency is 20 kHz.

In the equivalent circuit model shown in FIG. 5A, the coupling capacitances Cg1 to Cg4 between the power-transmitting coil 102 and the metal conductor 107 are set to the same value (100 pF) at the positions VL1 to VL4 of the power-transmitting coil 102. In reality, however, they do not necessarily become the same value depending on the shapes of the power-transmitting coil 102 and the metal conductor 107 and the positional relationship therebetween.

Figure 7B:
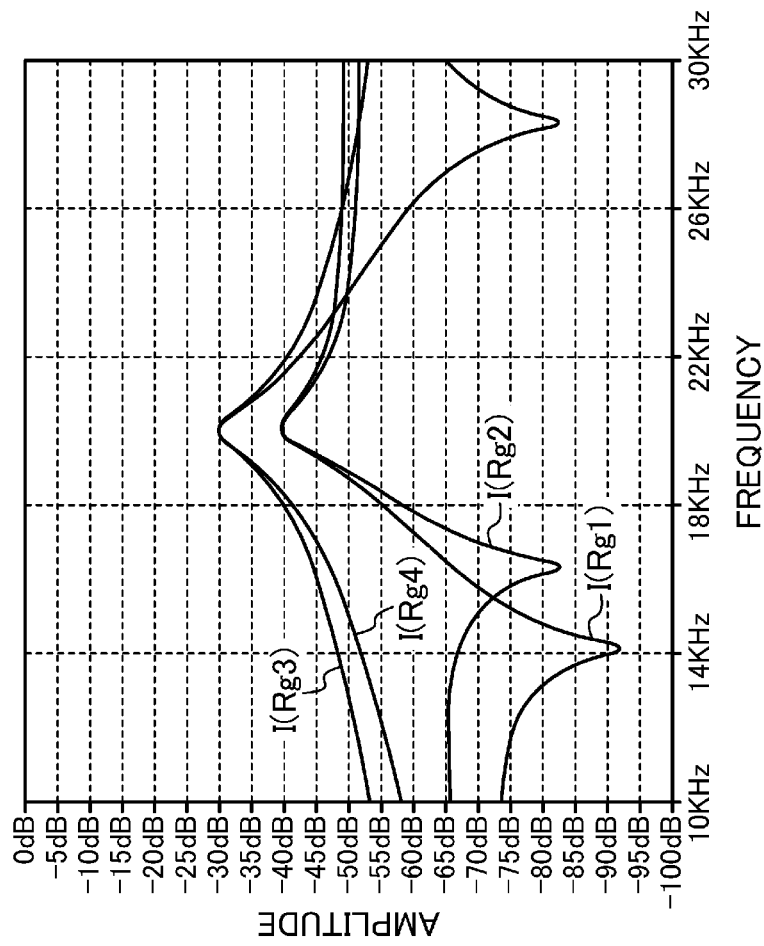
FIGS. 7A and 7B are views for explaining the procedure for determining the magnitudes of the capacitors connected to both terminals of the power-transmitting coil.
Figure 7A:
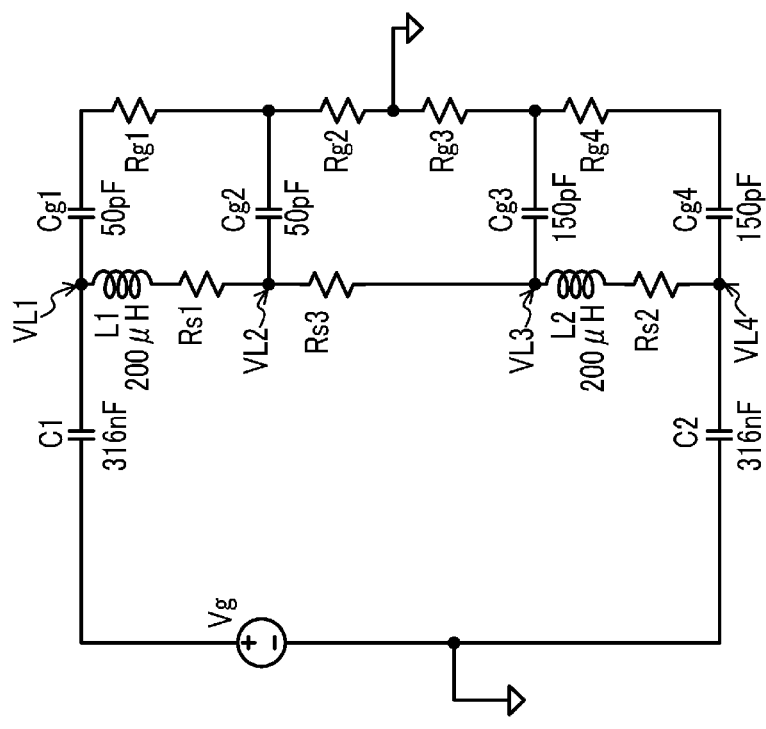

FIG. 7A shows an equivalent circuit model prepared considering such a situation, where the capacitances Cg1 and Cg2 at the positions VL1 and VL2 of the power-transmitting coil 102 are reduced from 100 pF to 50 pF while the capacitances Cg3 and Cg4 at the positions VL3 and VL4 are increased from 100 pF to 150 pF.

FIG. 7B shows frequency characteristics of the amplitudes of the currents induced into the regions Rg1 to Rg4 of the metal conductor 107 in the equivalent circuit mode shown in FIG. 7A. As shown in FIG. 7B, the maximum value of the currents flowing to the regions of the metal conductor 107 is increased from −34 dB (see I(Rg1) to I(Rg4) in FIG. 6) to −30 dB (see I(Rg3) and I(Rg4) in FIG. 7B). This is because the capacitances Cg3 and Cg4 at the positions VL3 and VL4 are larger than the capacitances Cg1 and Cg2 at the positions VL1 and VL2.

Figure 8A:
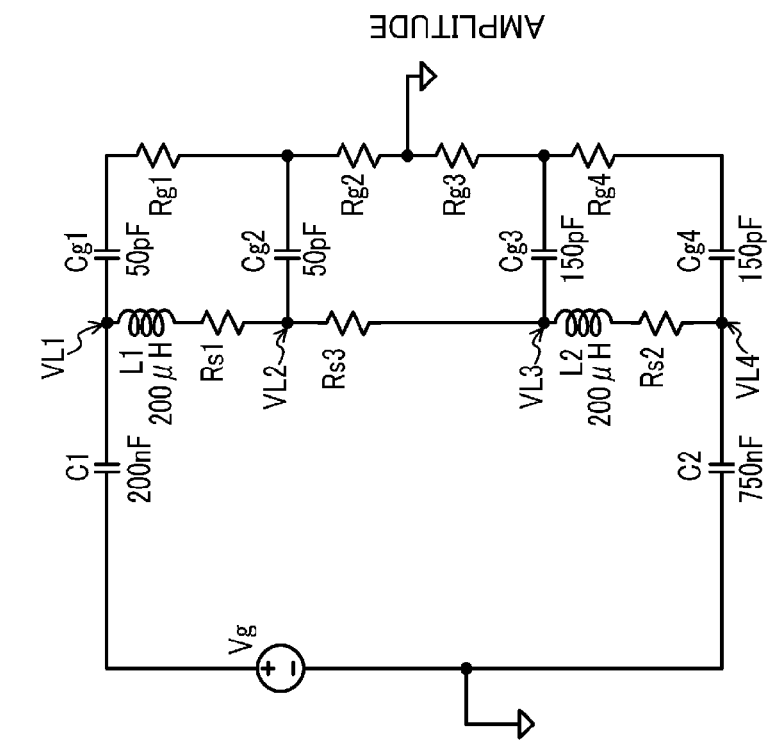
FIGS. 8A and 8B are views for explaining the procedure for determining the magnitudes of the capacitors connected to both terminals of the power-transmitting coil.

In such a situation, it is effective to reduce the potential at the position VL4 where the capacitance Cg4 has increased. FIG. 8A shows an equivalent circuit model having undergone such measures, where the capacitance of the capacitor C2 connected to the position VL4 is increased from 316 nF to 750 nF. In this relation, the capacitance of the capacitor C1 is set to 200 nF so that the combined capacitance of the capacitors C1 and C2 constitutes an LC resonant circuit with the power-transmitting coil 102.

Figure 8B:
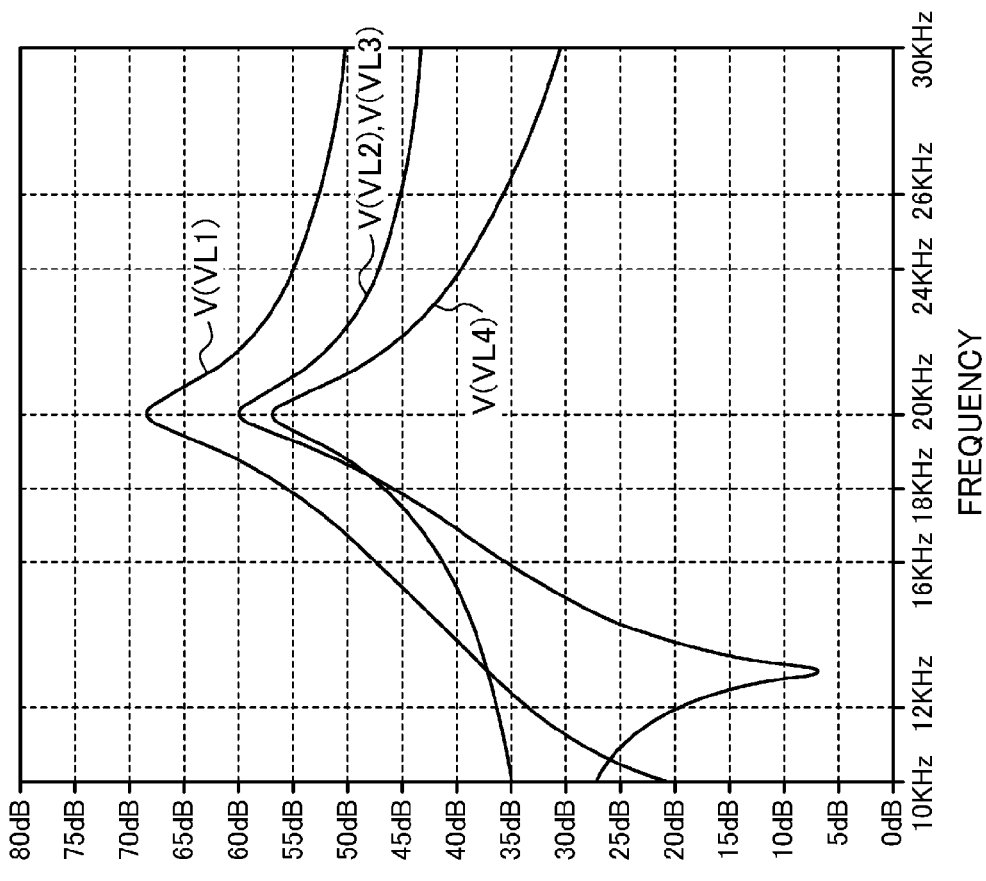
Figure 9:
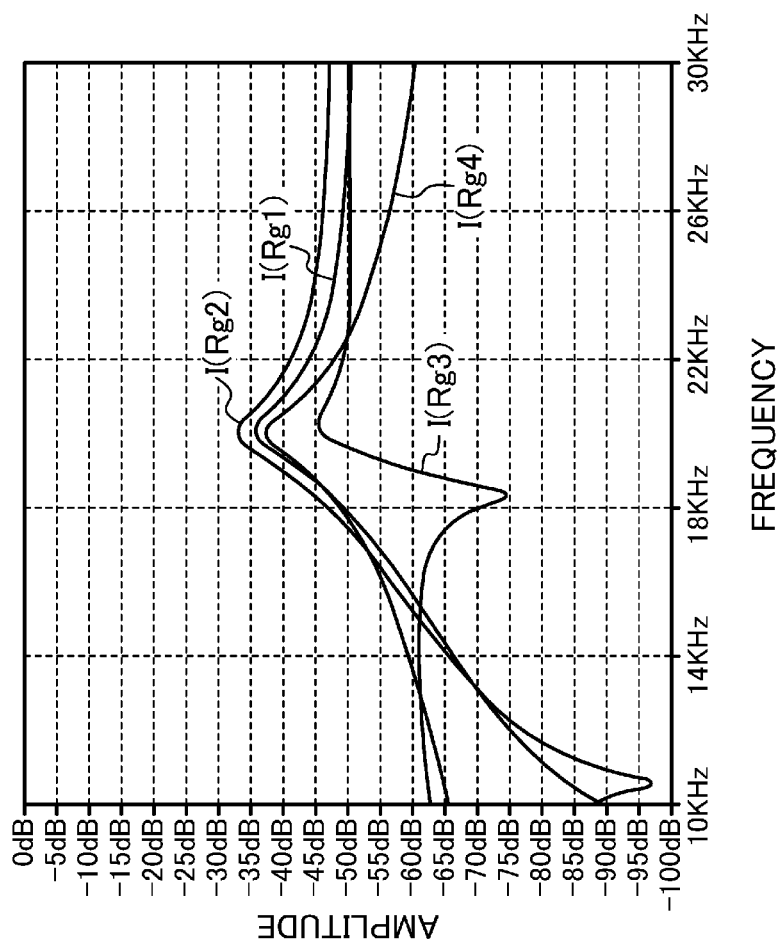
FIG. 9 is a view for explaining the procedure for determining the magnitudes of the capacitors connected to both terminals of the power-transmitting coil.

FIG. 8B shows frequency characteristics of the amplitudes of the voltages at the positions VL1 to VL4 in the equivalent circuit model shown in FIG. 8A. FIG. 9 shows frequency characteristics of the amplitudes of the currents induced into the regions Rg1 to Rg4 of the metal conductor 107 in the equivalent circuit model shown in FIG. 8A.

As shown in FIG. 8B, by relatively reducing the voltage V(VL4) at the position VL4 corresponding to Cg4 large in capacitance value and relatively increasing the voltage V(VL1) at the position VL1 corresponding to Cg1 small in capacitance value, the maximum value of the currents flowing to the regions of the metal conductor 107 is reduced from −30 dB (see I(Rg3) and I(Rg4) in FIG. 7B) to −33 dB (see I(Rg2) in FIG. 9).

As described above, according to the present disclosure, in the coil unit including the power-transmitting coil 102 into both terminals of which a high-frequency voltage is input, the metal conductor 107 placed near the power-transmitting coil 102, and the first and second capacitors C1a and C1b connected to the terminals of the power-transmitting coil 102, the influence of the leakage electromagnetic field caused by the induced current can be reduced by setting the ratio of the capacitance between the first capacitor C1a and the second capacitor C1b to a value at which the current induced into the metal conductor 107 due to capacitance coupling when a high-frequency voltage is input into the power-transmitting coil 102 is reduced.

According to the disclosure, it is preferable that the ratio between capacitances C1 and C2 (C1/C2) where C1 is the capacitance of the first capacitor C1a and C2 is the capacitance of the second capacitor C1b be set to satisfy conditions (1) and (2) below when a high-frequency voltage is input into the power-transmitting coil 102:

(1) The combined capacitance [C1×C2/(C1+C2)] of the first and second capacitors C1a and C1b serially connected to the power-transmitting coil 102 is constant.

(2) The current induced into the metal conductor 107 due to the capacitance coupling is smaller than that observed when C1=C2.

It is also preferable that the ratio of the capacitance (C1/C2) between C1a and C1b be individually set to satisfy condition (3) below in addition to condition (1) above:

(3) The current induced into the metal conductor due to the capacitance coupling is smallest.

It is further preferable that equation $f = \frac{1}{2\pi}(L\,C_s)^{1/2}$ where $C_s$ is the combined capacitance [C1×C2/(C1+C2)], f is the frequency of the high-frequency voltage, and L is the inductance of the power-transmitting coil 102 be satisfied to constitute an LC resonant circuit.

While the coil unit on the power-transmitting side has been described, the present disclosure is also applicable to the coil unit on the power-receiving side.

That is, in the coil unit including the power-receiving coil 104 to both terminals of which a high-frequency voltage is output, the metal conductor 108 placed near the power-receiving coil 104, and the first and second capacitors C2a and C2b connected to the terminals of the power-receiving coil 104, the influence of the leakage electromagnetic field caused by the induced current can be reduced by setting the ratio of the capacitance between the first capacitor C2a and the second capacitor C2b to a value at which the current induced into the metal conductor 108 due to capacitance coupling when a high-frequency voltage is output to the power-receiving coil 104 is reduced.

(Second Embodiment)

In the first embodiment, as the means for appropriately setting the potentials V(VL1) and V(VL4) at both terminals of the power-transmitting coil 102, the first and second capacitors C1a and C1b are provided at both terminals of the power-transmitting coil 102, and the capacitance values of C1a and C1b are set to values with which the current induced into the metal conductor 107 due to capacitance coupling is reduced.

In this embodiment, another means for appropriately setting the potentials V(VL1) and V(VL4) at both terminals of the power-transmitting coil 102 will be described.

Figure 10:
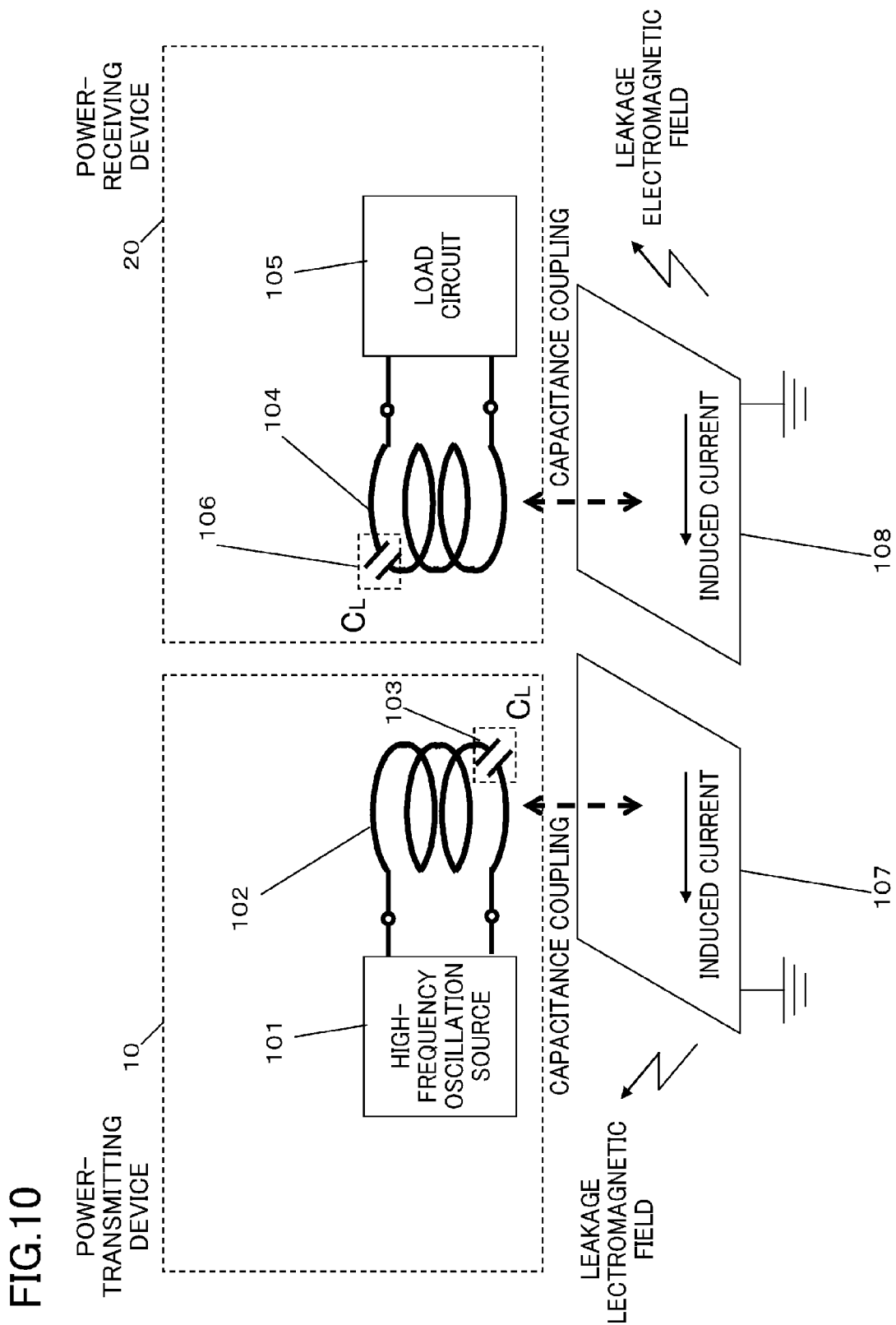
FIG. 10 is a view showing a configuration of a noncontact power transmission apparatus in the second embodiment of the present disclosure.

FIG. 10 is a view schematically showing a configuration of a noncontact power transmission apparatus in the second embodiment of the present disclosure. Note that, since the configuration of the part of the apparatus other than the coil units is the same as that shown in FIG. 1, description thereof is omitted here.

As shown in FIG. 10, each coil unit in this embodiment includes a power-transmitting coil 102 or a power-receiving coil 104 into or from both terminals of which a high-frequency voltage is input or output, a metal conductor 107 or 108 placed near the power-transmitting coil 102 or the power-receiving coil 104, and a capacitor $C_L$ inserted in the power-transmitting coil 102 or the power-receiving coil 104.

In this embodiment, by adjusting the position of the capacitor $C_L$ inserted in the power-transmitting coil 102 or the power-receiving coil 104, the capacitor $C_L$ is set to a value at which the current induced into the metal conductor 107 or 108 due to capacitance coupling is reduced.

Figure 11:
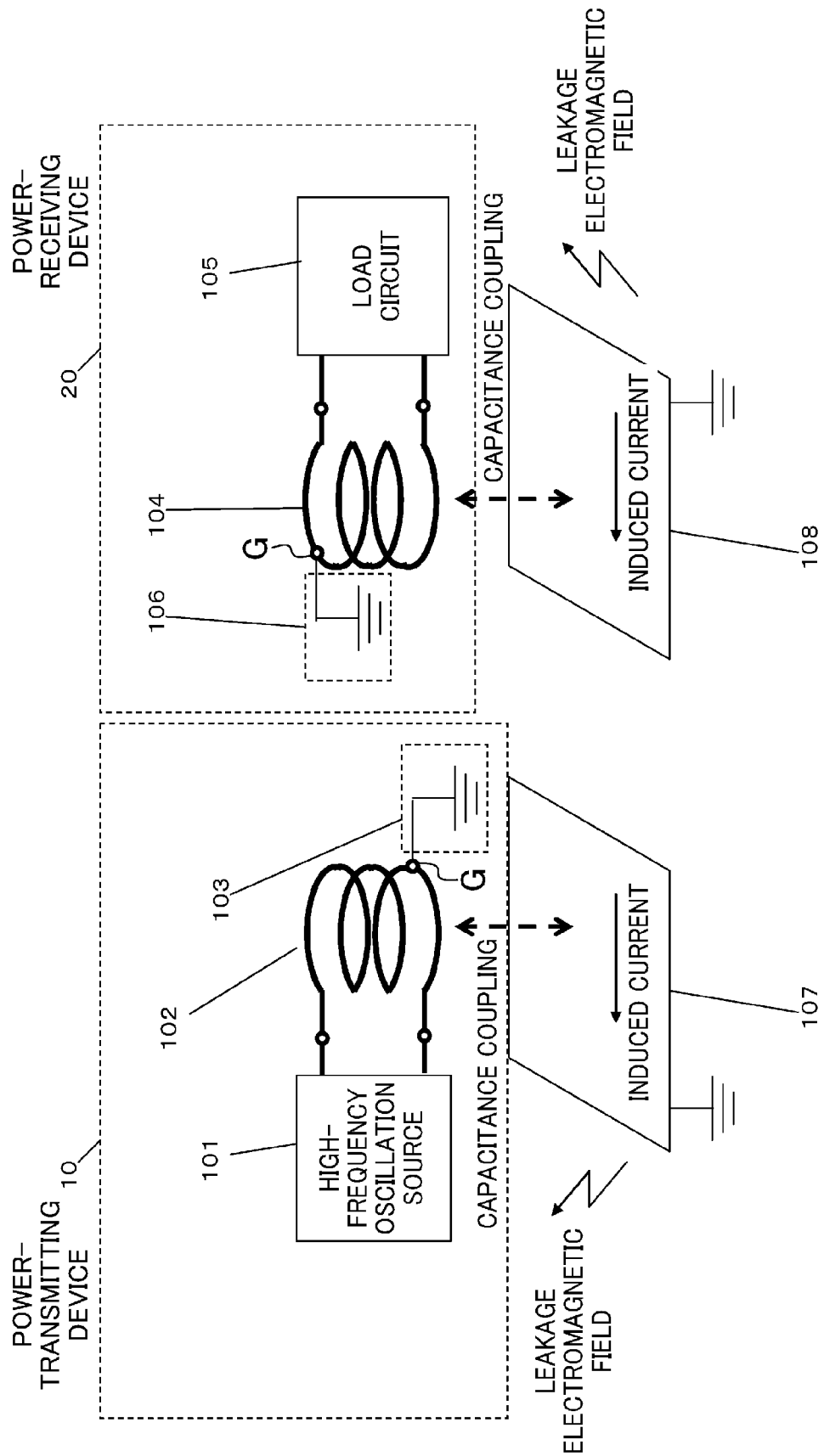
FIG. 11 is a view showing another configuration of the noncontact power transmission apparatus in the second embodiment of the present disclosure.

FIG. 11 is a view schematically showing another configuration of the noncontact power transmission apparatus in the second embodiment of the present disclosure. Note that, since the configuration of the part of the apparatus other than the coil units is the same as that shown in FIG. 1, description thereof is omitted here.

As shown in FIG. 11, the coil unit in this alteration includes the power-transmitting coil 102 or the power-receiving coil 104 into or from both terminals of which a high-frequency voltage is input or output, the metal conductor 107 or 108 placed near the power-transmitting coil 102 or the power-receiving coil 104, and a site G at which the power-transmitting coil 102 or the power-receiving coil 104 is grounded.

In this alteration, by adjusting the position of the site G at which the power-transmitting coil 102 or the power-receiving coil 104 is grounded, the site G is set to a position at which the current induced into the metal conductor 107 or 108 due to capacitance coupling is reduced.

A procedure for determining the position of the capacitor $C_L$ inserted in the power transmission coil 102 will be described hereinafter with reference to FIGS. 12A to 14B. Note that, to make the phenomenon easy to understand, results of circuit simulations using equivalent circuits are presented herein.

Figure 12A:
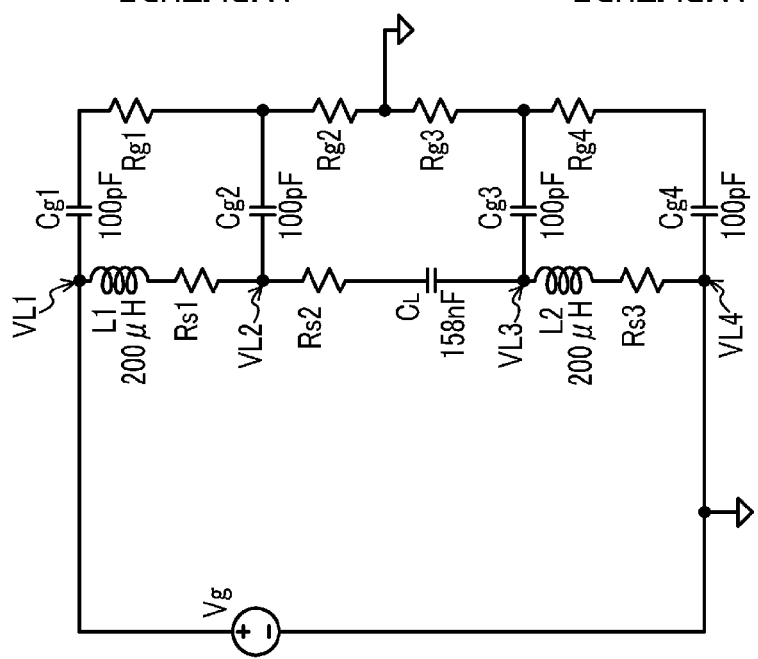
FIGS. 12A and 12B are views for explaining a procedure for determining the position at which a capacitor is inserted into the power-transmitting coil.

FIG. 12A is a view showing an equivalent circuit model of capacitance coupling between the power-transmitting coil 102 and the metal conductor 107. The power-transmitting coil 102 and the metal conductor 107 are capacitively coupled to each other at positions VL1 to VL4 of the power-transmitting coil 102 with capacitances Cg1 to Cg4. Also, the metal conductor 107 is represented by resistances Rg1 to Rg4 in the regions thereof.

In this model, the inductance (L) of the power-transmitting coil 102 is 400 μH, and the capacitor $C_L$ is inserted at the midpoint of the power-transmitting coil 102. With this, the power-transmitting coil 102 is separated by the capacitor $C_L$ into a first coil L1 and a second coil L2 each having an inductance of 200 μH. Also, the capacitances Cg1 to Cg4 are all 100 pF. The capacitor $C_L$ inserted in the power-transmitting coil 102 is set to 158 nF so as to constitute an LC resonant circuit with the power-transmitting coil 102.

Figure 12B:
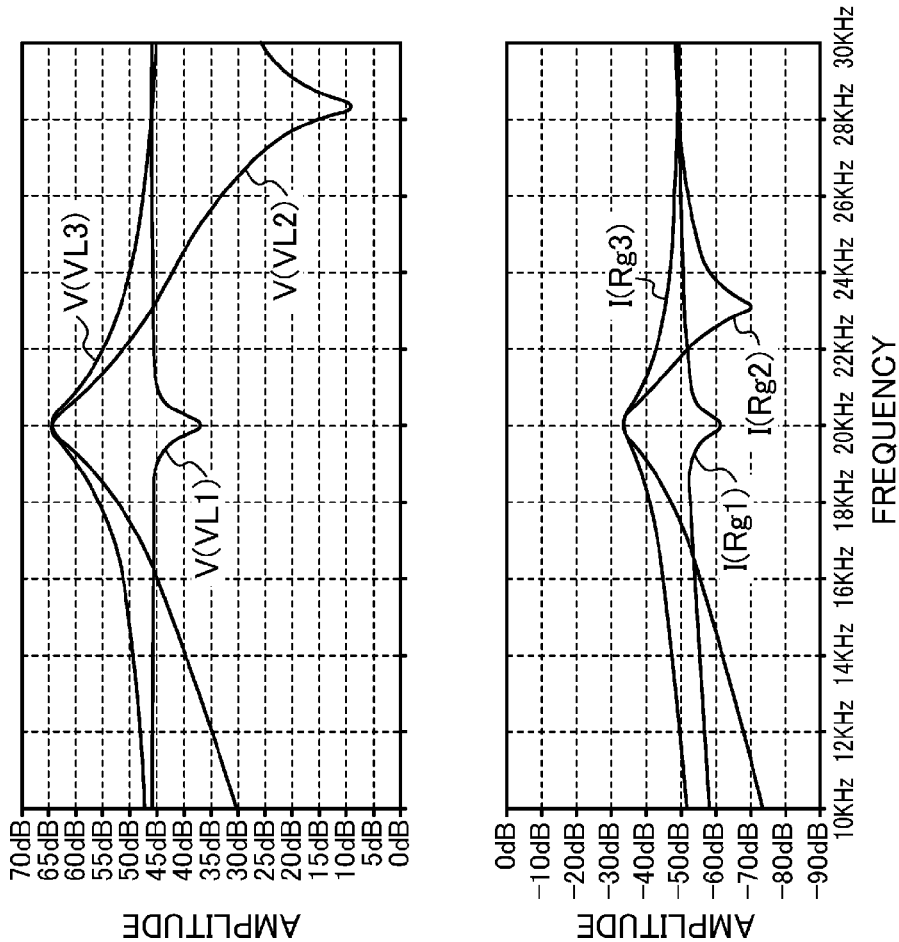

FIG. 12B shows frequency characteristics of the amplitudes V(VL1) to V(VL3) of the voltages at the positions VL1 to VL3 of the power-transmitting coil 102, and the amplitudes I(Rg1) to I(Rg3) of the currents induced into the regions Rg1 to Rg3 of the metal conductor 107, in the equivalent circuit model shown in FIG. 12A. Note that the amplitude I(Rg4) of the current induced into Rg4 is not shown in the graph because it is very small (−140 dB or less).

In the equivalent circuit model shown in FIG. 12A, the coupling capacitances Cg1 to Cg4 between the power-transmitting coil 102 and the metal conductor 107 are set to the same value (100 pF) at the positions VL1 to VL4 of the power-transmitting coil 102. In reality, however, they do not necessarily become the same value depending on the shapes of the power-transmitting coil 102 and the metal conductor 107 and the positional relationship therebetween.

Figure 13B:
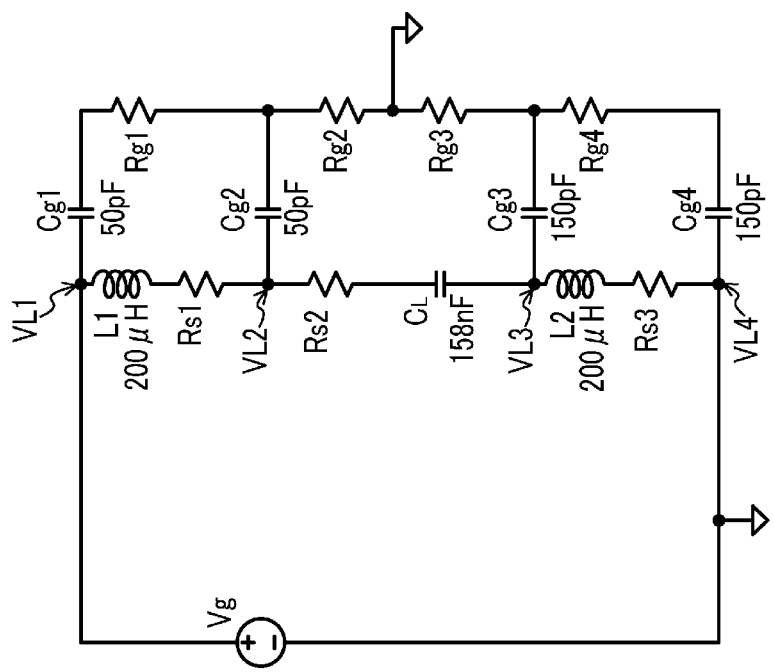
FIGS. 13A and 13B are views for explaining the procedure for determining the position at which the capacitor is inserted into the power-transmitting coil.
Figure 13A:
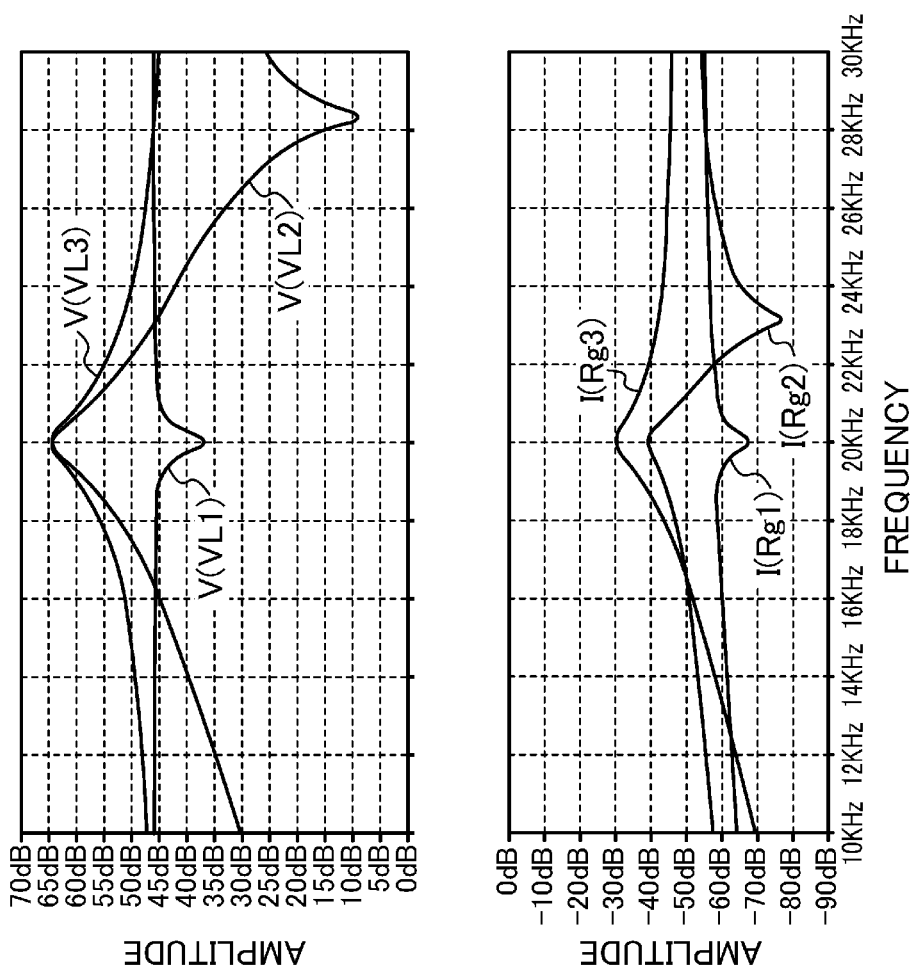

FIG. 13A shows an equivalent circuit model prepared considering such a situation, where the capacitances Cg1 and Cg2 at the positions VL1 and VL2 of the power-transmitting coil 102 are reduced from 100 pF to 50 pF while the capacitances Cg3 and Cg4 at the positions VL3 and VL4 are increased from 100 pF to 150 pF.

FIG. 13B shows frequency characteristics of the amplitudes of the voltages at the positions VL1 to VL3 of the power-transmitting coil 102, and the amplitudes I(Rg1) to I(Rg3) of the currents induced into the regions Rg1 to Rg3 of the metal conductor 107, in the equivalent circuit mode shown in FIG. 13A. Note that the amplitude I(Rg4) of the current induced into Rg4 is not shown in the graph because it is very small (−130 dB or less).

As shown in FIG. 13B, the maximum value of the currents flowing to the regions of the metal conductor 107 is increased from −35 dB (see I(Rg2) and I(Rg3) in FIG. 12B) to −30 dB (see I(Rg3) in FIG. 13B). This is because the capacitances Cg3 and Cg4 at the positions VL3 and VL4 are larger than the capacitances Cg1 and Cg2 at the positions VL1 and VL2.

In such a situation, it is effective to increase the voltage at VL2 corresponding to Cg2 small in capacitance, out of the positions VL2 and VL3 at both terminals of the capacitor $C_L$ inserted in the power-transmitting coil 102, and decrease the voltage at VL3 corresponding to Cg3 large in capacitance.

Figure 14A:
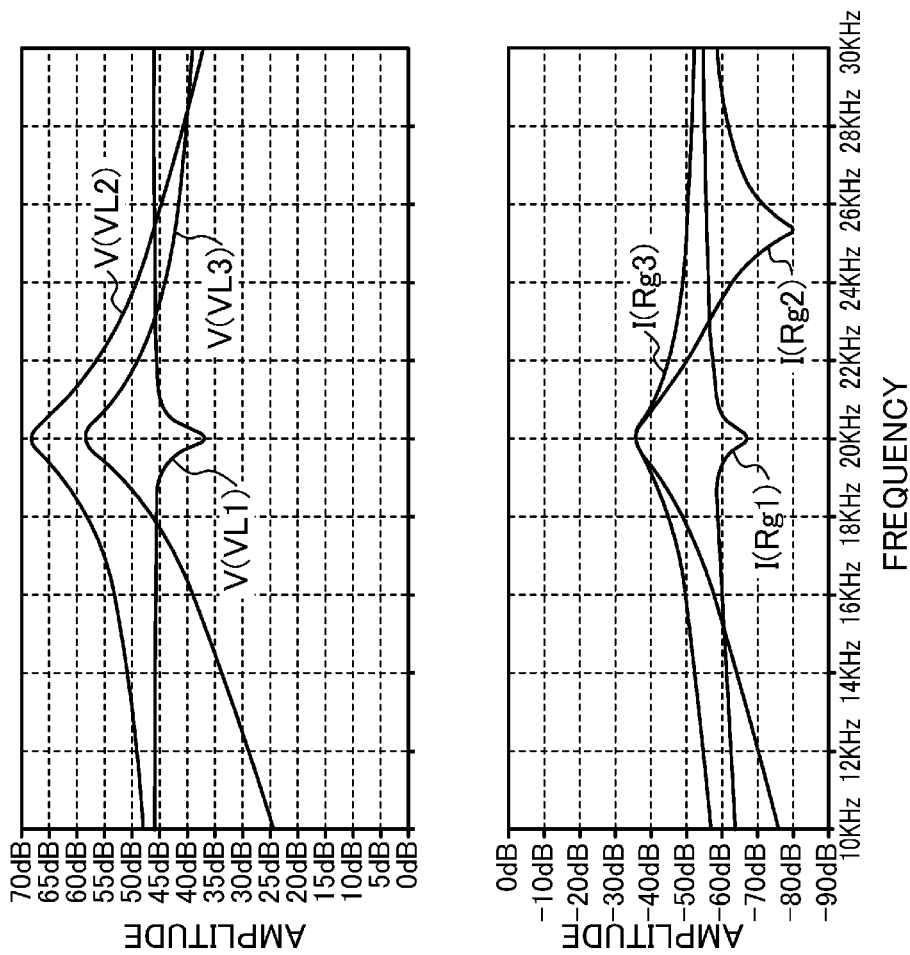
FIGS. 14A and 14B are views for explaining the procedure for determining the position at which the capacitor is inserted into the power-transmitting coil.

FIG. 14A shows an equivalent circuit model having undergone such measures, where the insertion position of the capacitor $C_L$ is set so that the inductance is separated into 300 μH for the first coil L1 and 100 μH for the second coil L2.

Figure 14B:
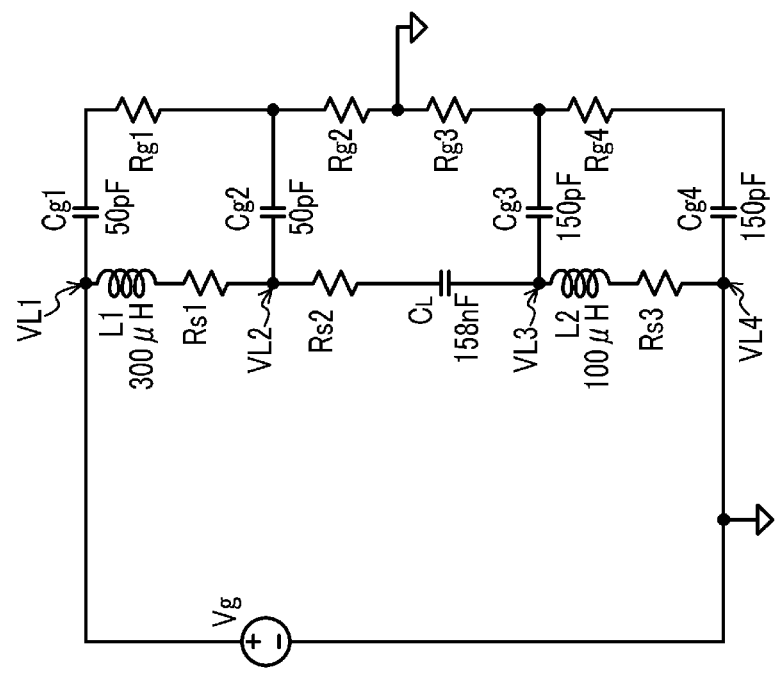

FIG. 14B shows frequency characteristics of the amplitudes of the voltages at the positions VL1 to VL4 of the power-transmitting coil 102, and the amplitudes of the currents induced into the regions Rg1 to Rg4 of the metal conductor 107, in the equivalent circuit model shown in FIG. 14A.

As shown in FIG. 14B, by relatively increasing the voltage V(VL2) at VL2 corresponding to Cg2 small in capacitance and relatively decreasing the voltage V(VL3) at VL3 corresponding to Cg3 large in capacitance, the maximum value of the currents flowing to the regions of the metal conductor 107 is reduced from −30 dB (see I(Rg3) in FIG. 13B) to −36 dB (see I(Rg2) and I(Rg3) in FIG. 14B).

Next, a procedure for determining the position of the site G at which the power transmission coil 102 is grounded will be described with reference to FIGS. 15A to 17B.

Figure 15B:
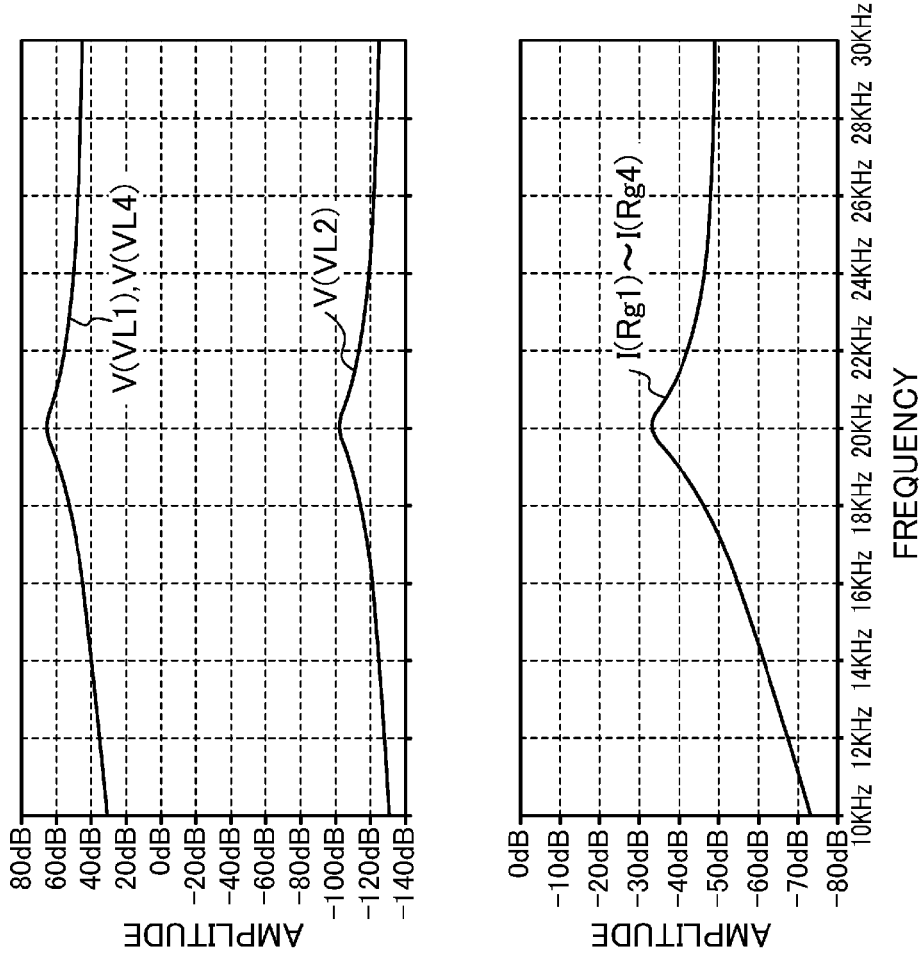
FIGS. 15A and 15B are views for explaining a procedure for determining the position at which the power-transmitting coil is grounded.
Figure 15A:
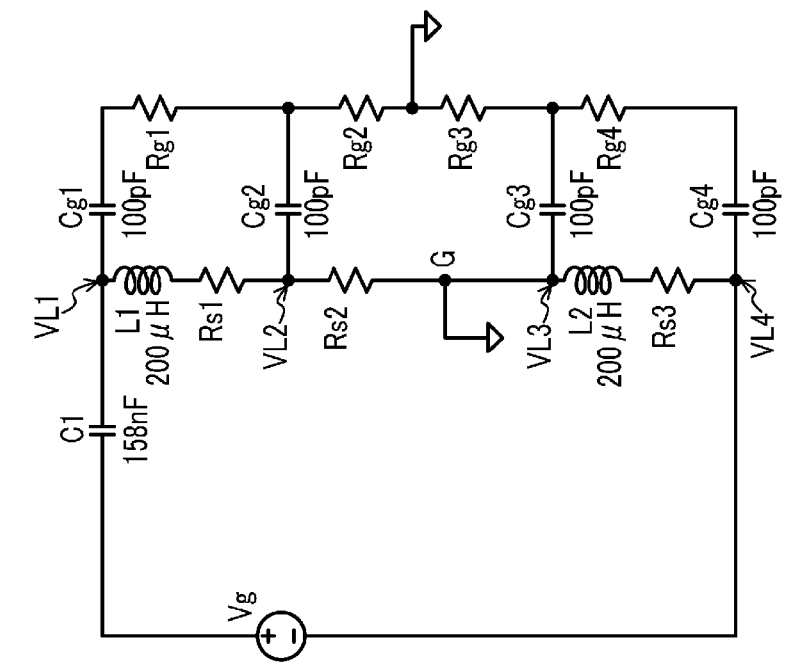

FIG. 15A is a view showing an equivalent circuit model of capacitance coupling between the power-transmitting coil 102 and the metal conductor 107. The power-transmitting coil 102 and the metal conductor 107 are capacitively coupled to each other at the positions VL1 to VL4 of the power-transmitting coil 102 with the capacitances Cg1 to Cg4. Also, the metal conductor 107 is represented by the resistances Rg1 to Rg4 in the regions thereof.

In this model, the inductance (L) of the power-transmitting coil 102 is 400 μH, and the power-transmitting coil 102 is separated by the site G at which the power-transmitting coil 102 is grounded into a first coil L1 and a second coil L2 each having an inductance of 200 μH. Also, the capacitances Cg1 to Cg4 are all 100 pF. A capacitor C1 (158 nF) that constitutes an LC resonant circuit with the power-transmitting coil 102 is serially connected to one terminal of the power-transmitting coil 102.

FIG. 15B shows frequency characteristics of the amplitudes of the voltages at the positions VL1, VL2, and VL4 of the power-transmitting coil 102, and the amplitudes I(Rg1) to I(Rg4) of the currents induced into the regions Rg1 to Rg4 of the metal conductor 107, in the equivalent circuit model shown in FIG. 15A.

In the equivalent circuit model shown in FIG. 15A, the coupling capacitances Cg1 to Cg4 between the power-transmitting coil 102 and the metal conductor 107 are set to the same value (100 pF) at the positions VL1 to VL4 of the power-transmitting coil 102. In reality, however, they do not necessarily become the same value depending on the shapes of the power-transmitting coil 102 and the metal conductor 107 and the positional relationship therebetween.

Figure 16B:
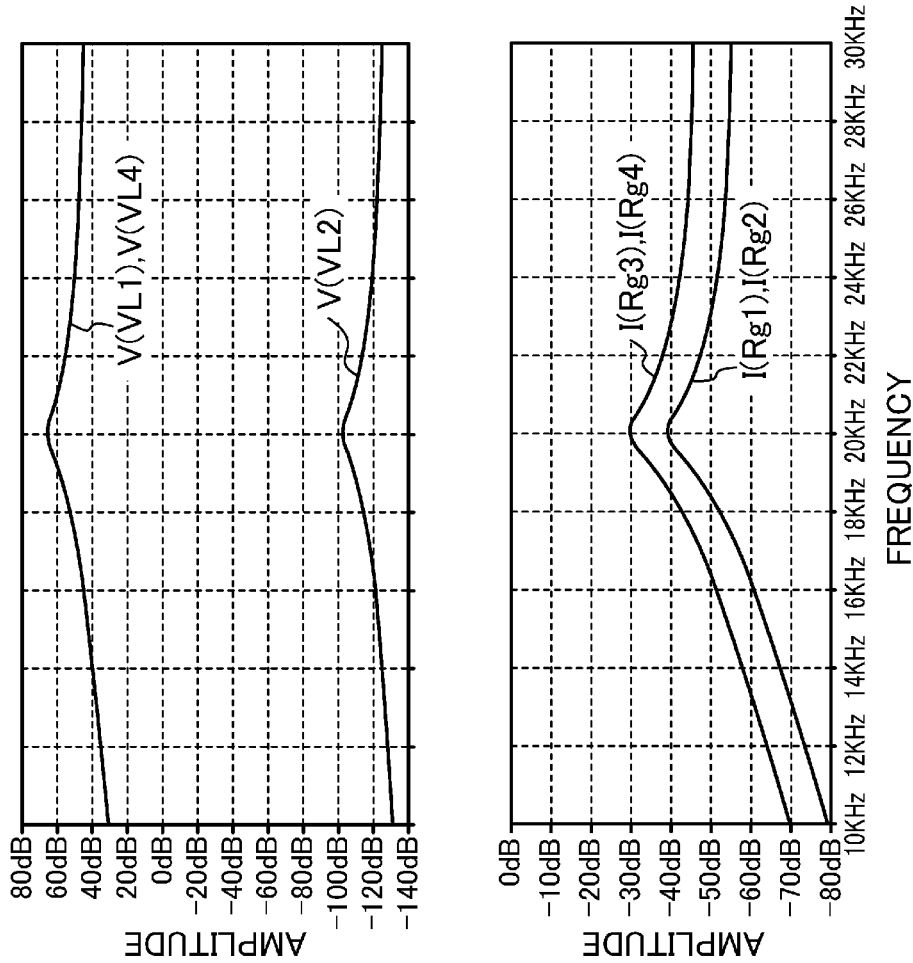
FIGS. 16A and 16B are views for explaining the procedure for determining the position at which the power-transmitting coil is grounded.
Figure 16A:
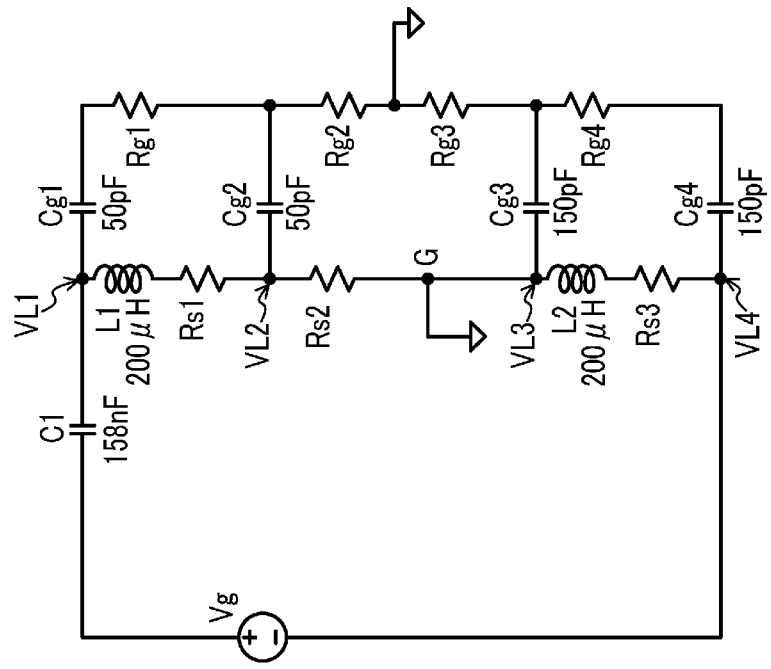

FIG. 16A shows an equivalent circuit model prepared considering such a situation, where the capacitances Cg1 and Cg2 at the positions VL1 and VL2 of the power-transmitting coil 102 are reduced from 100 pF to 50 pF while the capacitances Cg3 and Cg4 at the positions VL3 and VL4 are increased from 100 pF to 150 pF.

FIG. 16B shows frequency characteristics of the amplitudes of the voltages at the positions VL1, VL2, and VL4 of the power-transmitting coil 102, and the amplitudes I(Rg1) to I(Rg4) of the currents induced into the regions Rg1 to Rg4 of the metal conductor 107, in the equivalent circuit mode shown in FIG. 16A.

As shown in FIG. 16B, the maximum value of the currents flowing to the regions of the metal conductor 107 is increased from −33 dB (see I(Rg1) to I(Rg4) in FIG. 15B) to −30 dB (see I(Rg3) and I(Rg4) in FIG. 16B). This is because the capacitances Cg3 and Cg4 at the positions VL3 and VL4 of the power-transmitting coil 102 are larger than the capacitances Cg1 and Cg2 at the positions VL1 and VL2.

In such a situation, it is effective to increase the voltage at VL1 corresponding to Cg1 small in capacitance, out of the positions VL1 and VL4 at both terminals of the power-transmitting coil 102, and decrease the voltage at VL4 corresponding to Cg4 large in capacitance.

Figure 17A:
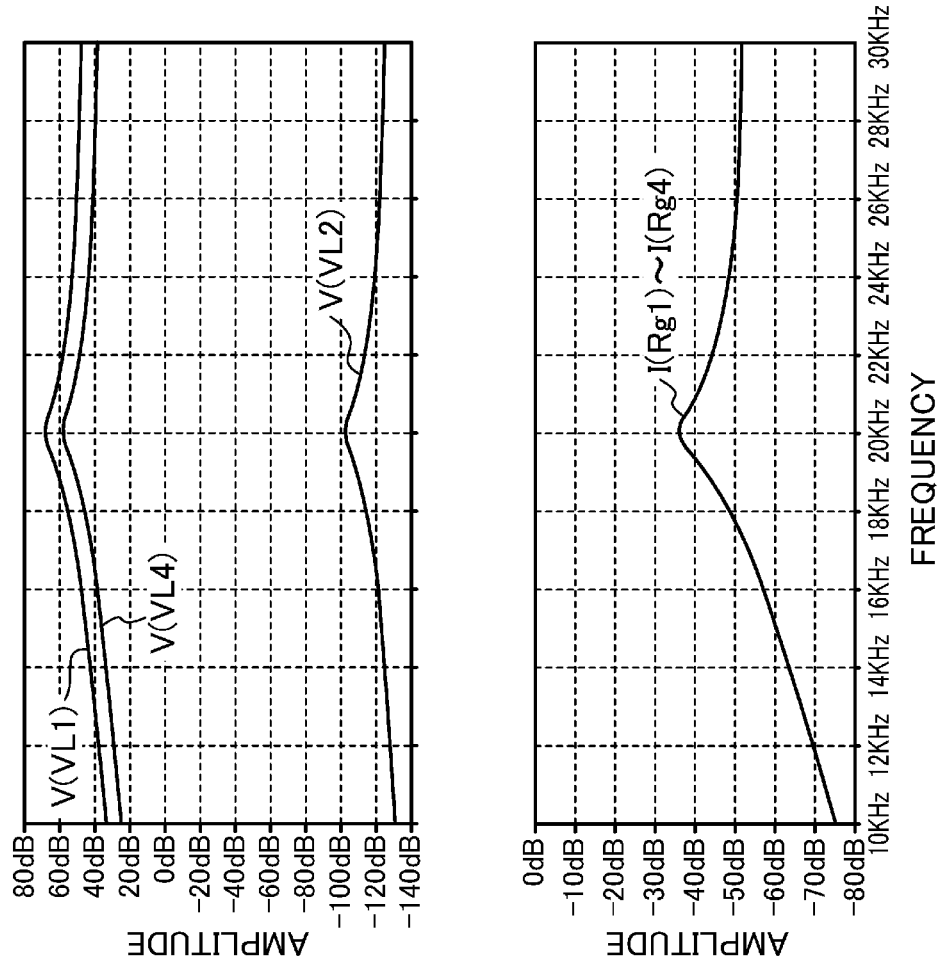
FIGS. 17A and 17B are views for explaining the procedure for determining the position at which the power-transmitting coil is grounded.

FIG. 17A shows an equivalent circuit model having undergone such measures, where the position of the ground site G of the power-transmitting coil 102 is set so that the inductance is separated into 300 μH for the first coil L1 and 100 μH for the second coil L2.

Figure 17B:
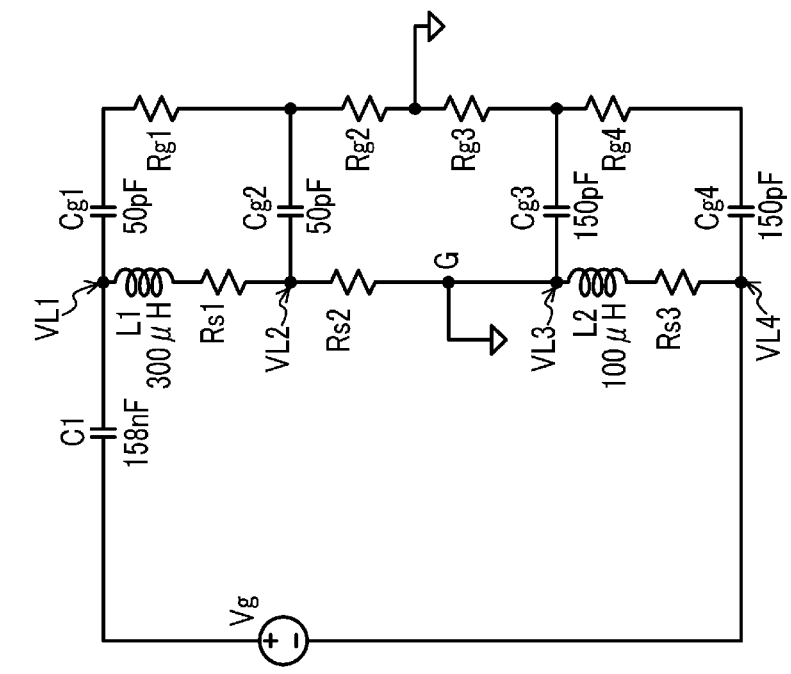

FIG. 17B shows frequency characteristics of the amplitudes of the voltages at the positions VL1, VL2, and VL4 of the power-transmitting coil 102, and the amplitudes of the currents induced into the regions Rg1 to Rg4 of the metal conductor 107, in the equivalent circuit model shown in FIG. 17A.

As shown in FIG. 17B, by relatively increasing the voltage V(VL1) at VL1 corresponding to Cg1 small in capacitance and relatively decreasing the voltage V(VL4) at VL4 corresponding to Cg4 large in capacitance, the maximum value of the currents flowing to the regions of the metal conductor 107 is reduced from −30 dB (see I(Rg3) and I(Rg4) in FIG. 16B) to −36 dB (see I(Rg1) to I(Rg4) in FIG. 17B).

As described above, according to the present disclosure, in the coil unit including the power-transmitting coil 102 into both terminals of which a high-frequency voltage is input, the metal conductor 107 placed near the power-transmitting coil 102, and the capacitor $C_L$ inserted in the power-transmitting coil 102, the power-transmitting coil 102 is separated by the capacitor $C_L$ into the first coil L1 and the second coil L2 different in the magnitude of the inductance. By setting the ratio of the inductance between the first coil L1 and the second coil L2 to a value at which the current induced into the metal conductor 107 due to capacitance coupling when a high-frequency voltage is input into the power-transmitting coil 102 is reduced, the influence of the leakage electromagnetic field caused by the induced current can be reduced.

It is preferable that equation $f=1/2\pi (L\ C_L)^{1/2}$ where $C_L$ is the capacitance of the capacitor $C_L$, f is the frequency of the high-frequency voltage, and L is the inductance of the power-transmitting coil 102 be satisfied to constitute an LC resonant circuit.

Also, according to the present disclosure, in the coil unit including the power-transmitting coil 102 into both terminals of which a high-frequency voltage is input, the metal conductor 107 placed near the power-transmitting coil 102, and the site G at which the power-transmitting coil 102 is grounded, the power-transmitting coil 102 is separated by the ground site G into the first coil L1 and the second coil L2 different in the magnitude of the inductance. By setting the ratio of the inductance between the first coil L1 and the second coil L2 to a value at which the current induced into the metal conductor 107 due to capacitance coupling when a high-frequency voltage is input into the power-transmitting coil 102 is reduced, the influence of the leakage electromagnetic field caused by the induced current can be reduced.

While the coil unit on the power-transmitting side has been described, the present disclosure is also applicable to the coil unit on the power-receiving side.

The coil unit and the noncontact power transmission apparatus according to the present disclosure can be applied as a noncontact charger for a portable apparatus, an electric propulsion vehicle, etc., for example.

What is claimed is:

1. A coil unit configured to transmit or receive electric power by electromagnetic induction in a noncontact manner, comprising:
   a coil into or from both terminals of which a high-frequency voltage is input or output;
   a metal conductor placed near the coil; and
   a first capacitor and a second capacitor respectively connected to the terminals of the coil, wherein
   the ratio of the capacitance between the first capacitor and the second capacitor is set to a value at which a current induced into the metal conductor due to capacitance coupling when a high-frequency voltage is input into or output from the coil is reduced, and
   the ratio between capacitances C1 and C2 (C1/C2) where C1 is the capacitance of the first capacitor and C2 is the capacitance of the second capacitor is set to satisfy conditions (1) and (2) below when a high-frequency voltage is input into or output from the coil:
   (1) a combined capacitance [C1×C2/(C1+C2)] of the first capacitor and the second capacitor serially connected to the coil is constant; and
   (2) the current induced into the metal conductor due to capacitance coupling is smaller than that observed when C1=C2.

2. The coil unit of claim 1, wherein
   the ratio between the capacitances C1 and C2 (C1/C2) is individually set to satisfy condition (3) below, in addition to the condition (1):
   (3) the current induced into the metal conductor due to capacitance coupling is smallest.

3. The coil unit of claim 1, wherein equation $f=1/2\pi (L\ Cs)^{1/2}$ where Cs is the combined capacitance [C1×C2/(C1+C2)], f is the frequency of the high-frequency voltage, and L is the inductance of the coil is satisfied.

4. The coil unit of claim 1, wherein
   the coil is housed in a case, and
   the metal conductor is a member constituting at least part of the case.

5. A noncontact power transmission apparatus configured to transmit electric power from a power-transmitting coil to a power-receiving coil by electromagnetic induction in a noncontact manner, wherein
   at least one of the power-transmitting coil and the power-receiving coil includes:
   a coil into or from both terminals of which a high-frequency voltage is input or output,
   a metal conductor placed near the coil, and
   a first capacitor and a second capacitor respectively connected to the terminals of the coil, and
   the ratio of the capacitance between the first capacitor and the second capacitor is set to a value at which a current induced into the metal conductor due to capacitance coupling when a high-frequency voltage is input into or output from the coil is reduced, and
   the ratio between capacitances C1 and C2 (C1/C2) where C1 is the capacitance of the first capacitor and C2 is the capacitance of the second capacitor is set to satisfy conditions (1) and (2) below when a high-frequency voltage is input into or output from the coil:

(1) a combined capacitance [C1×C2/(C1+C2)] of the first capacitor and the second capacitor serially connected to the coil is constant; and
(2) the current induced into the metal conductor due to capacitance coupling is smaller than that observed when C1=C2.

6. The noncontact power transmission apparatus of claim 5, wherein
the coil is housed in a case, and
the metal conductor is a member constituting at least part of the case.

7. The noncontact power transmission apparatus of claim 5, wherein
the power-receiving coil is mounted on a vehicle, and
the metal conductor is a member constituting at least part of the vehicle.

8. A coil unit configured to transmit or receive electric power by electromagnetic induction in a noncontact manner, comprising:
a coil into or from both terminals of which a high-frequency voltage is input or output;
a metal conductor placed near the coil; and
a capacitor inserted in the coil,
wherein
the coil is separated by the capacitor into a first coil and a second coil different in the magnitude of inductance, and
the ratio of the inductance between the first coil and the second coil is set to a value at which a current induced into the metal conductor due to capacitance coupling when a high-frequency voltage is input into or output from the coil is reduced.

9. The coil unit of claim 8, wherein equation $f=1/2\pi (L C_L)^{1/2}$ where $C_L$ is the capacitance of the capacitor, f is the frequency of the high-frequency voltage, and L is the inductance of the coil is satisfied.

10. A coil unit configured to transmit or receive electric power by electromagnetic induction in a noncontact manner, comprising:
a coil into or from both terminals of which a high-frequency voltage is input or output;
a metal conductor placed near the coil; and
a ground site at which the coil is grounded,
wherein
the coil is separated by the ground site into a first coil and a second coil different in the magnitude of inductance, and
the ratio of the inductance between the first coil and the second coil is set to a value at which a current induced into the metal conductor due to capacitance coupling when a high-frequency voltage is input into or output from the coil is reduced.

11. The coil unit of claim 10, wherein the amount of the current induced into the metal conductor due to capacitance coupling is smaller than that of a current induced into the metal conductor when a middle point of the coil is grounded.

* * * * *